(12) United States Patent
Kim

(10) Patent No.: US 12,739,640 B2
(45) Date of Patent: Sep. 15, 2026

(54) METHOD AND DEVICE FOR APPLYING INTEGRITY PROTECTION OR VERIFICATION PROCEDURE TO ENHANCE SECURITY IN WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/284,715

(22) PCT Filed: Mar. 31, 2022

(86) PCT No.: PCT/KR2022/004596

§ 371 (c)(1),
(2) Date: Sep. 28, 2023

(87) PCT Pub. No.: WO2022/211524

PCT Pub. Date: Oct. 6, 2022

(65) Prior Publication Data

US 2024/0163673 A1 May 16, 2024

(30) Foreign Application Priority Data

Mar. 31, 2021 (KR) ........................ 10-2021-0042393

(51) Int. Cl.

| | |
|---|---|
| ***H04W 12/108*** | (2021.01) |
| ***H04L 9/40*** | (2022.01) |
| ***H04W 80/02*** | (2009.01) |

(52) U.S. Cl.
CPC .......... *H04W 12/108* (2021.01); *H04W 80/02* (2013.01)

(58) Field of Classification Search
CPC ....... H04W 8/245; H04L 63/123; H04L 69/08
See application file for complete search history.

(56) References Cited

U.S. PATENT DOCUMENTS

| | | | |
|---|---|---|---|
| 10,959,292 B2 | 3/2021 | Palat et al. | |
| 2018/0270668 A1* | 9/2018 | Nair | H04W 76/10 |

(Continued)

FOREIGN PATENT DOCUMENTS

| | | |
|---|---|---|
| CN | 109802809 A | 5/2019 |
| CN | 111386725 A | 7/2020 |

(Continued)

OTHER PUBLICATIONS

Ericsson, 'Correction to integrity protection in DRB addition and modification', R2-1916474, 3GPP TSG RAN WG2 #108, Reno, USA, Nov. 19, 2019.

(Continued)

*Primary Examiner* — San Htun
(74) *Attorney, Agent, or Firm* — Jefferson IP Law, LLP

(57) ABSTRACT

The present disclosure relates to a 5G or 6G communication system for supporting a higher data transmission rate. The present disclosure provides a method and device for changing a version of a PDCP layer device without loss. A method for a terminal of the present disclosure may comprise the steps of: receiving an RRC message including bearer configuration information; establishing an NR PDCP entity on the basis of NR PDCP configuration information; and setting an integrity protection function in an NR PDCP entity.

14 Claims, 14 Drawing Sheets

(56) References Cited

U.S. PATENT DOCUMENTS

| | | | | |
|---|---|---|---|---|
| 2019/0075466 | A1* | 3/2019 | Nair | H04L 63/205 |
| 2019/0150037 | A1 | 5/2019 | Mildh et al. | |
| 2019/0174576 | A1* | 6/2019 | Palat | H04W 76/10 |
| 2019/0350020 | A1* | 11/2019 | Kim | H04W 76/10 |
| 2020/0053566 | A1* | 2/2020 | Kim | H04L 47/32 |
| 2020/0221526 | A1 | 7/2020 | Jin et al. | |
| 2020/0229259 | A1 | 7/2020 | Teyeb et al. | |
| 2020/0245401 | A1 | 7/2020 | Ingale et al. | |
| 2020/0281031 | A1 | 9/2020 | Wang et al. | |
| 2021/0105847 | A1* | 4/2021 | Prabhakar | H04W 36/26 |
| 2021/0345436 | A1* | 11/2021 | Teyeb | H04W 76/15 |
| 2022/0264306 | A1* | 8/2022 | Kim | H04L 1/1671 |
| 2022/0312520 | A1* | 9/2022 | Guo | H04W 12/033 |
| 2023/0388790 | A1* | 11/2023 | Nakarmi | H04W 12/03 |

FOREIGN PATENT DOCUMENTS

| | | | |
|---|---|---|---|
| CN | 112567881 | A | 3/2021 |
| EP | 3 709 551 | A1 | 9/2020 |
| KR | 10-2020-0068724 | A | 6/2020 |
| WO | 2019/031883 | A1 | 2/2019 |
| WO | 2019/074297 | A1 | 4/2019 |

OTHER PUBLICATIONS

3rd Generation Partnership Project; Technical Specification Group Radio Access Network; NR; Radio Resource Control (RRC) protocol specification (Release 16)', 3GPP TS 38.331 V16.4.0 (2021-30), Mar. 30, 2021.

Ericsson, 'Discussion on capturing PDCP impacts for user plane integrity protection', R2-2101477, 3GPP TSG RAN WG2 #113e, Jan. 14, 2021, Best Available Date: Jan. 25, 2021-Feb. 5, 2021.

3G pp TR 33.853 V1 .5.0, 3rd Generation Partnership Project; Technical Specification Group Services and System Aspects; Key issues and potential solutions for integrity protection of the user plane; (Release 16), Mar. 17, 2021, Best Available dDate: Mar. 2021.

Huawei et al., NR PDCP configuration for SRB in E-UTRA connected to 5GC, R2-1713134, 3GPP TSG-RAN WG2 Meeting #100, Reno, USA, Nov. 17, 2017, Best Available Date: Nov. 27-Dec. 12, 2017.

Extended European Search Report dated Jul. 29, 2024, issued in European Patent Application No. 22781643.6.

Korean Office Action with English translation dated Jan. 15, 2026; Korean Appln. No. 10-2021-0042393.

Huawei et al.; NR PDCP configuration for SRB in E-UTRA connected to 5GC; 3GPP TSG-RAN WG2 Meeting #100; R2-1713134; Reno, USA; Nov. 27-Dec. 1, 2017.

Chinese Office Action with English translation dated Jun. 16, 2026; Chinese Appln. No. 202280026035.5.

* cited by examiner

METHOD AND DEVICE FOR APPLYING INTEGRITY PROTECTION OR VERIFICATION PROCEDURE TO ENHANCE SECURITY IN WIRELESS COMMUNICATION SYSTEM

CROSS-REFERENCE TO RELATED APPLICATION(S)

This application is a U.S. National Stage application under 35 U.S.C. § 371 of an International application number PCT/KR2022/004596, filed on Mar. 31, 2022, which is based on and claims priority to Korean patent application number 10-2021-0042393, filed on Mar. 31, 2021 in the Korean Intellectual Property Office, the disclosure of which is incorporated by reference herein in its entirety.

TECHNICAL FIELD

The disclosure relates to a method for changing the version of a packet data convergence protocol (PDCP) without data loss in a next-generation mobile communication system and a method and device for performing integrity protection or verification procedure in a long-term evolution (LTE) system (or evolved packet core (EPC) system or a UE establishing a connection with an EPC). More specifically, the disclosure relates to a method and device for changing an LTE PDCP layer device into a new radio (NR) PDCP layer device or changing an NR PDCP layer device into an LTE PDCP layer device.

BACKGROUND ART 5G mobile communication technology defines a wide frequency band to enable fast transmission speed and new services and may be implemented in frequencies below 6 GHz ('sub 6 GHz'), such as 3.5 GHz, as well as in ultra-high frequency bands ('above 6 GHz'), such as 28 GHz and 39 GHz called millimeter wave (mmWave). Further, 6G mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by 1/10.

In the early stage of 5G mobile communication technology, standardization was conducted on beamforming and massive MIMO for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 pre-processing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, NR UE power saving, non-terrestrial network (NTN) which is direct communication between UE and satellite to secure coverage in areas where communications with a terrestrial network is impossible, and positioning technology.

Also being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step RACH for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metaverse services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

DETAILED DESCRIPTION OF THE INVENTION

Technical Problem

A network supporting a next-generation mobile communication system may also support an LTE system (evolved packet core (EPC) system) or an NR system (5G core (5GC) system) and may support services for UEs by installing next-generation mobile communication base stations (gNBs or base stations using NR radio access technology) and LTE base stations (eNBs or base stations using E-UTRA radio access technology). In the network, the UE may access the next-generation mobile communication base station or LTE base station to receive support for a service. However, when the UE is simultaneously connected to the next-generation mobile communication base station and LTE base station, the network may operate more transmission resources and requires a procedure for changing the LTE PDCP layer device that processes data serviced through the LTE base station into the NR PDCP layer device of the next-generation mobile communication system to allow the next-generation mobile communication base station with enhanced performance to manage all traffic of the UE. Further, it is required to prevent data loss when the LTE PDCP layer device is changed into the NR PDCP layer device or when the NR PDCP layer device is changed into the LTE PDCP layer device due to a change of the PDCP layer device between the two different systems.

Further, the network requires a method for supporting integrity protection or verification procedure when the LTE system or LTE base station establishes a connection to enhance security by using an integrity protection or verification procedure for the UE that uses the LTE PDCP layer device for each bearer.

Technical Solution

According to an aspect of the disclosure, a method by a UE may comprise receiving an RRC message from a base station and, when the RRC message includes information instructing to change a version of a PDCP layer device of the UE, performing at least one operation for changing the version of the PDCP layer device based on the information.

According to another aspect of the disclosure, a UE comprises a transceiver and a controller connected to the transceiver. The controller may receive an RRC message from a base station and, when the RRC message includes information instructing to change a version of a PDCP layer device of the UE, perform at least one operation for changing the version of the PDCP layer device based on the information.

According to another aspect of the disclosure, a method by a user equipment (UE) connected to a long-term evolution (LTE) base station connected to an evolved packet core (EPC) system may comprise receiving an RRC message including bearer configuration information, the bearer configuration information including new radio (NR) packet data convergence protocol (PDCP) configuration information about a data radio bearer (DRB), and the NR PDCP configuration information including information related to an integrity protection function for the DRB, establishing an NR PDCP entity based on the NR PDCP configuration information, and configuring the integrity protection function in the NR PDCP entity.

According to another aspect of the disclosure, a method by a base station may comprise generating an RRC message including bearer configuration information and transmitting the RRC message to a UE connected to an evolved packet core (EPC) system. The bearer configuration information may include new radio (NR) packet data convergence protocol (PDCP) configuration information about a data radio bearer (DRB), and the NR PDCP configuration information may include information related to an integrity protection function for the DRB.

According to another aspect of the disclosure, a UE connected to a long-term evolution (LTE) base station connected to an evolved packet core (EPC) system may comprise a transceiver and a controller connected to the transceiver. The controller may be configured to receive an RRC message including bearer configuration information, the bearer configuration information including new radio (NR) packet data convergence protocol (PDCP) configuration information about a data radio bearer (DRB), and the NR PDCP configuration information including information related to an integrity protection function for the DRB, establish an NR PDCP entity based on the NR PDCP configuration information, and configure the integrity protection function in the NR PDCP entity.

According to another aspect of the disclosure, a base station may comprise a transceiver and a controller connected to the transceiver. The controller may be configured to generate an RRC message including bearer configuration information and transmit the RRC message to a UE connected to an evolved packet core (EPC) system. The bearer configuration information may include new radio (NR) packet data convergence protocol (PDCP) configuration information about a data radio bearer (DRB), and the NR PDCP configuration information may include information related to an integrity protection function for the DRB.

Advantageous Effects

In the disclosure, when the UE is simultaneously connected to the next-generation mobile communication base station and LTE base station, the network may operate more transmission resources and performs a procedure for changing the LTE PDCP layer device that processes data serviced through the LTE base station into the NR PDCP layer device of the next-generation mobile communication system to allow the next-generation mobile communication base station with enhanced performance to manage all traffic of the UE. The disclosure proposes a method and device for preventing data loss in a procedure for changing the UE's PDCP layer device version in the above-described procedure (when the LTE PDCP layer device of the UE is changed into the NR PDCP layer device or when the NR PDCP layer device is changed into the LTE PDCP layer device), thereby preventing transmission delay and transmission waste due to unnecessary retransmissions in a higher layer device (e.g., the transmission control protocol/internet protocol (TCP/IP) layer device).

Further, the network may support an integrity protection (or verification) function by adding the integrity protection (or verification) function to the LTE PDCP layer device or changing the version of the PDCP layer device from the LTE PDCP layer device into the NR PDCP layer device supporting the integrity protection (or verification) function (or resetting to the NR PDCP layer device or instructing to change) when the LTE system or LTE base station enhances security by using an integrity protection or verification procedure for the UE using the LTE PDCP layer device for each bearer by establishing a connection.

MODE FOR CARRYING OUT THE INVENTION

Figure 1:
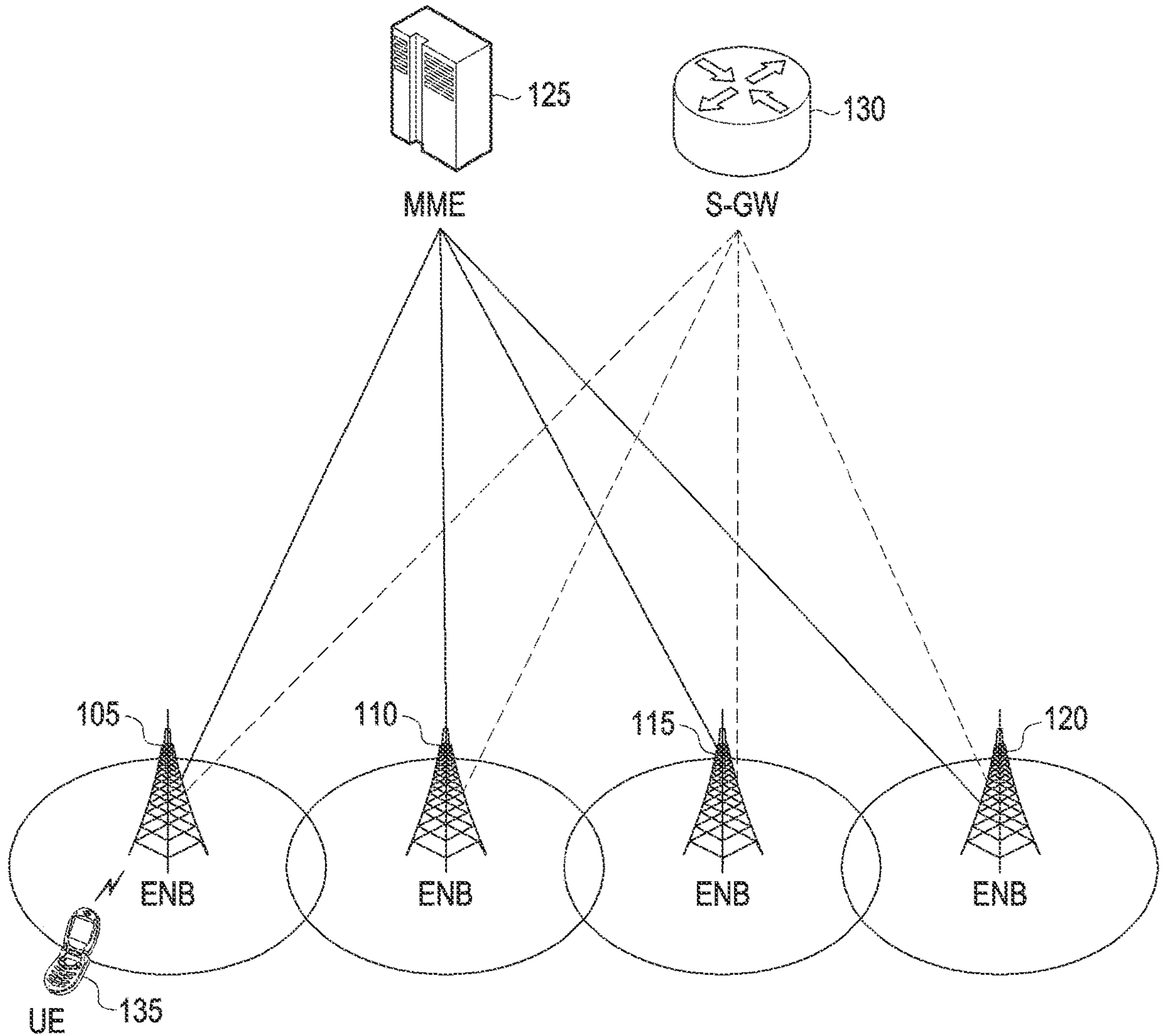
FIG. 1 is a view illustrating a structure of an LTE system according to an embodiment of the disclosure.

Hereinafter, the operational principle of the disclosure is described below with reference to the accompanying drawings. When determined to make the subject matter of the present disclosure unclear, the details of the known functions or configurations may be skipped. The terms as used herein are defined considering the functions in the present disclosure and may be replaced with other terms according to the intention or practice of the user or operator. Therefore, the terms should be defined based on the overall disclosure.

When determined to make the subject matter of the disclosure unnecessarily unclear, the detailed description of known functions or configurations may be skipped in describing embodiments of the disclosure. Hereinafter, embodiments of the disclosure are described in detail with reference to the accompanying drawings.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

For ease of description, hereinafter, some of the terms and names defined in the 3rd generation partnership project long-term evolution (3GPP LTE) or NR standards may be used in the disclosure. However, the disclosure is not limited by such terms and names and may be likewise applicable to systems conforming to other standards. In the disclosure, eNB may be used interchangeably with gNB for convenience of description. In other words, the base station described as an eNB may represent a gNB. The term UE may refer to mobile phones, NB-IoT devices, sensors, as well as other wireless communication devices.

Further, in the disclosure, the network may support an integrity protection (or verification) function by adding the integrity protection (or verification) function to the LTE PDCP layer device or changing the version of the PDCP layer device from the LTE PDCP layer device into the NR PDCP layer device supporting the integrity protection (or verification) function (or resetting to the NR PDCP layer device or instructing to change) when the LTE system or LTE base station enhances security by using an integrity protection or verification procedure for the UE using the LTE PDCP layer device for each bearer by establishing a connection.

In the disclosure, a network supporting a next-generation mobile communication system may also support an LTE system (evolved packet core (EPC) system) or an NR system (5G core (5GC) system) and may support services for UEs by next-generation mobile communication base stations (gNBs or base stations using NR radio access technology) and LTE base stations (eNBs or base stations using E-UTRA radio access technology). In the network, the UE may access the next-generation mobile communication base station or LTE base station to receive support for a service. However, when the UE is simultaneously connected to the next-generation mobile communication base station and LTE base station, the network may operate more transmission resources and requires a procedure for changing the LTE PDCP layer device that processes data serviced through the LTE base station into the NR PDCP layer device of the next-generation mobile communication system to allow the next-generation mobile communication base station (NR base station) with enhanced performance to manage all traffic of the UE. Further, data loss may occur when the LTE PDCP layer device is changed into the NR PDCP layer device or when the NR PDCP layer device is changed into the LTE PDCP layer device due to a change of the PDCP layer device between the two different systems. On the contrary, if the UE (non-standalone (NSA)) is simultaneously connected to the NR base station and the LTE base station loses connection with the NR base station and receives service only from the LTE base station, a procedure for changing the NR PDCP layer device back into the LTE PDCP layer device is required and, during this course, data loss may occur.

Further, the network may support an integrity protection (or verification) function by adding the integrity protection (or verification) function to the LTE PDCP layer device or changing the version of the PDCP layer device from the LTE PDCP layer device into the NR PDCP layer device supporting the integrity protection (or verification) function (or resetting to the NR PDCP layer device or instructing to change) when the LTE system or LTE base station enhances security by using an integrity protection or verification procedure for the UE using the LTE PDCP layer device for each bearer by establishing a connection.

Therefore, the disclosure proposes a procedure of a PDCP layer device to prevent data loss when the UE receives a radio resource control (RRC) message from the LTE base station or NR base station and is instructed to change the LTE PDCP layer device into the NR PDCP layer device or change the NR PDCP layer device into the LTE PDCP layer device for a bearer having the same bearer identifier (first bearer identifier (eps-BearerIdentity) or second bearer identifier (drb-Identity)) or different bearer identifier (first bearer identifier (eps-BearerIdentity) or second bearer identifier (drb-Identity)) (for example, the first bearer identifier (eps-BearerIdentity) is the same, but the second bearer identifier (drb-Identity) value corresponding to the previously set LTE (PDCP) (or LTE RLC) may be set to be different from or identical to the second bearer identifier (drb-Identity) corresponding to the newly set NR PDCP, or the first bearer identifier (eps-BearerIdentity) is the same but the second bearer identifier (drb-Identity) value corresponding to the previously set NR PDCP (or LTE RLC) may be set to be different from or identical to the second bearer identifier (drb-Identity) corresponding to the newly set LTE PDCP. Further, the disclosure proposes an RRC configuration procedure that may support an integrity protection (or verification) function by changing the version of the PDCP layer device from the LTE PDCP layer device to the NR PDCP layer device supporting the integrity protection (or verification) function (or by resetting to, or instructing to change to, the NR PDCP layer device) so as to enhance security using an integrity protection or verification procedure.

Specifically, before the version of the PDCP layer device is changed, the UE transfers the data stored in the pre-change PDCP layer device (e.g., LTE PDCP layer device) to the newly changed PDCP layer device (e.g., NR PDCP layer device) or newly stores data in the newly changed PDCP layer device (e.g., NR PDCP layer device) or regards data as data newly received by the newly changed PDCP layer device (e.g., NR PDCP layer device) to process data.

In the foregoing, what data among the data stored in the pre-change PDCP layer device (e.g., LTE PDCP layer device) is to be transferred and stored to the newly changed PDCP layer device (e.g., NR PDCP layer device) may be performed by one of the following methods.

First method: All data stored in the pre-change PDCP layer device (e.g., LTE PDCP layer device or NR PDCP layer device) is transferred and stored in the newly changed PDCP layer device (e.g., NR PDCP layer device or LTE PDCP layer device) to be processed as new data, and is transferred to the lower layer device to perform transmission.

The second method (cumulative retransmission): All data that have values larger than or equal to the PDCP serial number or COUNT value of the first data for which successful transfer is not acknowledged (RLC NACK) from the radio link control (RLC) layer devices (RLC status PDUs) connected with the pre-change PDCP layer device among the data stored in the pre-change PDCP layer device (e.g., LTE PDCP layer device or NR PDCP layer device) are transferred or stored to the newly changed PDCP layer device (e.g., NR PDCP layer device or LTE PDCP layer device) in ascending order or all data received from the higher layer device later than the first data are transferred and stored in order to the newly changed PDCP layer device to be regarded as new data and are transferred to the lower layer device to perform transmission.

Third method (selective retransmission): Only data for which successful transfer is not acknowledged (RLC NACK) from the radio link control (RLC) layer devices (RLC status PDUs) connected with the pre-change PDCP layer device among the data stored in the pre-change PDCP layer device (e.g., LTE PDCP layer device or NR PDCP layer device) are transferred or stored to the newly changed PDCP layer device (e.g., NR PDCP layer device or LTE PDCP layer device) in ascending order of PDCP serial number or COUNT value or in order of reception from the higher layer device to be regarded as new data and are transferred to the lower layer device to perform transmission.

As another method, whether successful transfer of data is acknowledged by the PDCP layer device may be identified by the PDCP status report of the PDCP layer device as well as by the RLC status report of the RLC layer device.

Further, the disclosure proposes an RRC configuration procedure that may support an integrity protection (or verification) function by changing the version of the PDCP layer device from the LTE PDCP layer device to the NR PDCP layer device supporting the integrity protection (or verification) function or by setting as the NR PDCP from the beginning (or by resetting to, or instructing to change to, the NR PDCP layer device) so as to enhance security using an integrity protection or verification procedure.

In the foregoing, when enhancing security using an integrity protection or verification procedure, since the LTE PDCP layer device does not support the integrity protection or verification procedure, the version of the PDCP layer device is changed into the NR PDCP layer device that supports the integrity protection (or verification) function (or reset to the NR PDCP layer device or instructed to change) so that the integrity protection (or verification) function may be supported according to the integrity protection (or verification) indicator (integrityProtection) of the NR PDCP layer device configuration information of the RRC message. In the foregoing, in the NR PDCP layer device configuration information (pdcp-config in 3GPP TS 38.331), the integrity protection (or verification) indicator (integrityProtection) may be set (or present) in the LTE system (evolved packet core (EPC) system) or NR system (5G core (5GC) system). As another method, in the NR PDCP layer device configuration information (pdcp-config in 3GPP 38.331), as the integrity protection (or verification) indicator (integrityProtection), an indicator for the UE connected to the LTE system (evolved packet core (EPC) system) and an indicator for the UE connected to the NR system (5G core (5GC) system) each may be introduced and defined so that the network may easily configure (or put into existence) the integrity protection or verification function in different UEs for each bearer according to the UE capability.

Further, the disclosure specifically proposes each method for supporting an integrity protection or verification function in a transmission or reception procedure of the PDCP layer device of split DRB or LTE/WLAN aggregation (LWA) or AM DRB (e.g., PDCP layer device using reordering function) or a transmission or reception procedure of the PDCP layer device for unacknowledged mode data radio bearer (UM DRB) or a transmission or reception procedure of the list decoding for acknowledged mode data radio bearer (AM DRB) (e.g., PDCP layer device not using reordering function) so that the LTE PDCP layer device may support integrity protection (or verification) function when enhancing security using an integrity protection or verification procedure.

FIG. 1 is a view illustrating a structure of an LTE system according to an embodiment of the disclosure.

Referring to FIG. 1, a radio access network of the LTE system includes next-generation base stations (evolved node B—hereinafter, "ENB" or "base station") 105, 110, 115, and 120, a mobility management entity (MME) 125, and a serving gateway (S-GW) 130. A user equip equipment (hereinafter, "UE" or "terminal") 135 accesses an external network through the ENB 105, 110, 115, and 120 and the S-GW 130.

The ENBs 105, 110, 115, and 120 of FIG. 1 correspond to legacy node Bs in the universal mobile telecommunication system (UMTS) system. The ENBs 105, 110, 115, and 120 are connected with the UE 135 through a wireless channel and plays a more complicated role than the legacy node B. Since in the LTE system all user traffic as well as real-time services, such as voice over Internet protocol (VoIP) service through an Internet protocol is serviced through a shared channel, there is needed an apparatus that performs scheduling by compiling state information, such as UEs' buffer states, available transmit power states, or channel states, and the ENBs 105, 110, 115, and 120 are in charge of the same. One ENB typically controls multiple cells. For example, the LTE system adopts, as a radio access technology, orthogonal frequency division multiplexing (hereinafter, "OFDM") on a 20 MHz bandwidth in order to implement a transmission speed of 100 Mbps. Further, the LTE system applies adaptive modulation & coding (AMC) that determines a modulation scheme and a channel coding rate in compliance with the channel state of the UE. The S-GW 130 is a device providing a data bearer, and the serving gateway 130 generates or removes a data bearer under the control of the MME 125. The MME is an apparatus that is in charge of various control functions as well as mobility management functions for the UE and is connected with multiple base stations.

Figure 2:
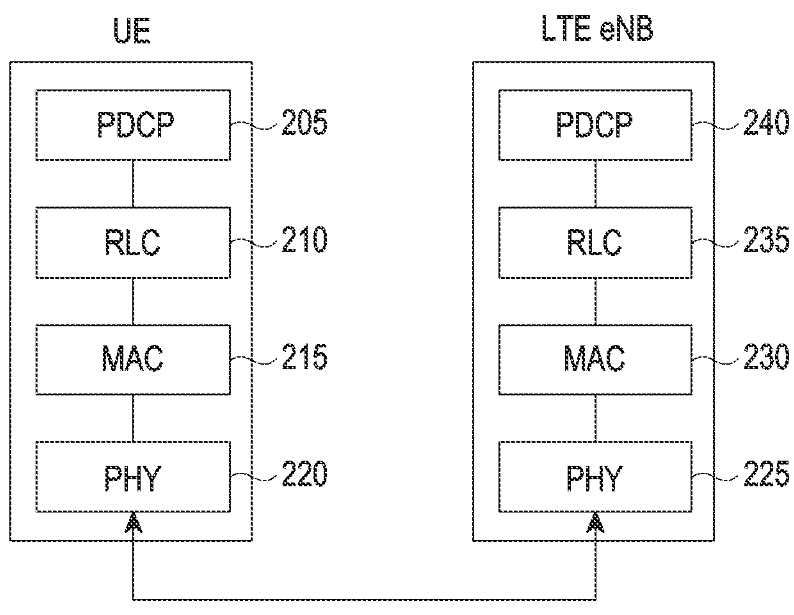
FIG. 2 is a view illustrating a structure of a radio protocol in an LTE system according to an embodiment of the disclosure.

FIG. 2 is a view illustrating a structure of a radio protocol in an LTE system according to an embodiment of the disclosure.

Referring to FIG. 2, the LTE system wireless protocol includes PDCPs 205 and 240, RLCs 210 and 235, and MACs 215 and 230 for the UE and ENB, respectively. The PDCPs 205 and 240 are in charge of IP header compression/reconstruction. The major functions of the PDCP may be summarized as follows.

Header compression and decompression: ROHC only)

Transfer of user data

In-sequence delivery of upper layer PDUs at PDCP re-establishment procedure for RLC AM For split bearers in DC (only support for RLC AM), PDCP PDU routing for transmission and PDCP PDU reordering for reception duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The radio link controls (RLCs) 210 and 235 reconfigure a PDCP packet data unit (PDU) to an appropriate size and perform an auto repeat request (ARQ) operation. The major functions of the RLC may be summarized as follows.

Transfer of upper layer PDUs

Error correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 215 and 230 are connected to several RLC layer devices configured in one UE and multiplexes RLC PDUs into an MAC PDU and demultiplexes RCL PDUs from the MAC PDU. The major functions of the MAC may be summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding The physical layers (PHY) 220 and 225 channel-code and modulate higher layer data into OFDM symbols, transmit the OFDM symbols through a wireless channel or demodulates OFDM symbols received through a wireless channel, channel-decodes and transfer the same to a higher layer.

Figure 3:
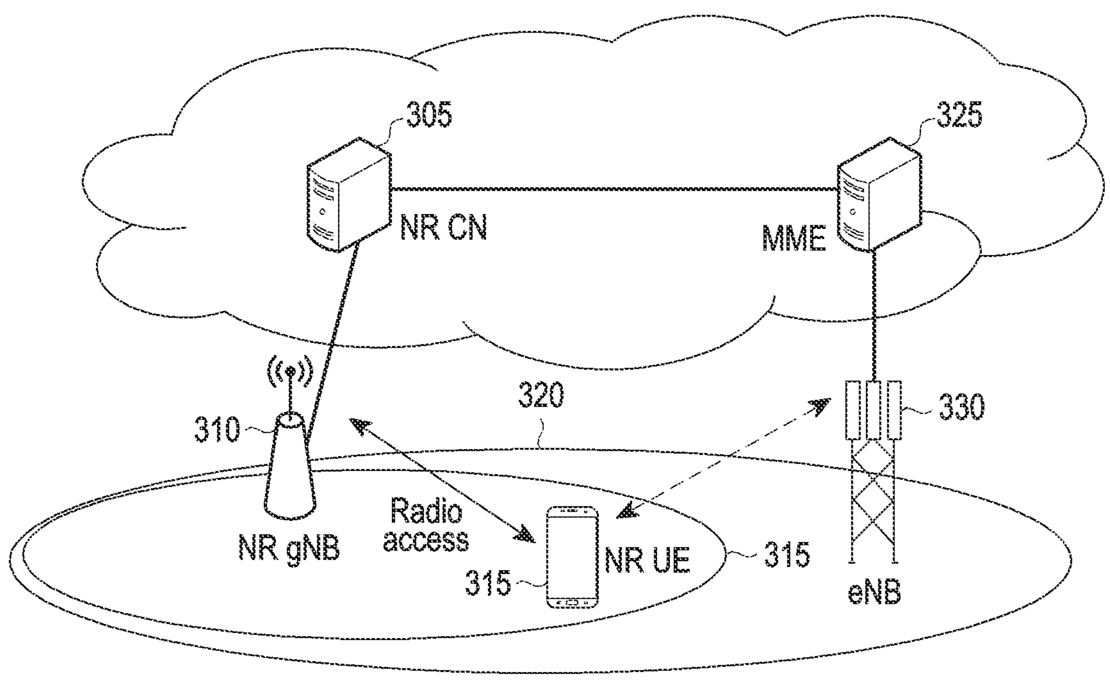
FIG. 3 is a view illustrating a structure of a next-generation mobile communication system according to an embodiment of the disclosure.

FIG. 3 is a view illustrating a structure of a next-generation mobile communication system according to an embodiment of the disclosure.

Referring to FIG. 3, as shown, a radio access network of a next-generation mobile communication system (hereinafter, NR or 2 g) includes a next-generation base station (new radio node B, hereinafter NR gNB or NR base station) 310 and a new radio core network (NR CN) 305. A new radio user equipment (hereinafter, NR UE or terminal) 315 accesses an external network through the NR gNB 310 and the NR CN 305.

In FIG. 3, the NR gNB 310 corresponds to the evolved node B (eNB) of the legacy LTE system. The NR gNB 310 is connected with the NR UE 315 via a radio channel and may provide a superior service to that of the legacy node B. Since in the next-generation mobile communication system, all user traffic is serviced through a shared channel, there is needed an apparatus that performs scheduling by compiling state information, such as UEs' buffer states, available transmit power states, or channel states, and the NR gNB 310 is in charge of the same. One NR gNB typically controls multiple cells. To implement ultra-high data rate transmission as compared with the current LTE, the next-generation mobile communication system may have a bandwidth higher than the existing maximum bandwidth, and the orthogonal frequency division multiplexing (hereinafter, OFDM) may be used as the radio access technology, and beamforming technology may be additionally combined. Further, the next-generation mobile communication system applies adaptive modulation & coding (AMC) that determines a modulation scheme and a channel coding rate in compliance with the channel state of the UE. The NR CN 305 performs functions such as mobility support, bearer configuration, and quality of service (QoS) configuration. The NR CN is an apparatus that is in charge of various control functions as well as mobility management functions for the UE and is connected with multiple base stations. Further, the next-generation mobile communication system may be linked with the legacy LTE system. The NR CN is connected to the MME 325 through a network interface. The MME is connected to the eNB 330, which is a legacy base station.

Figure 4:
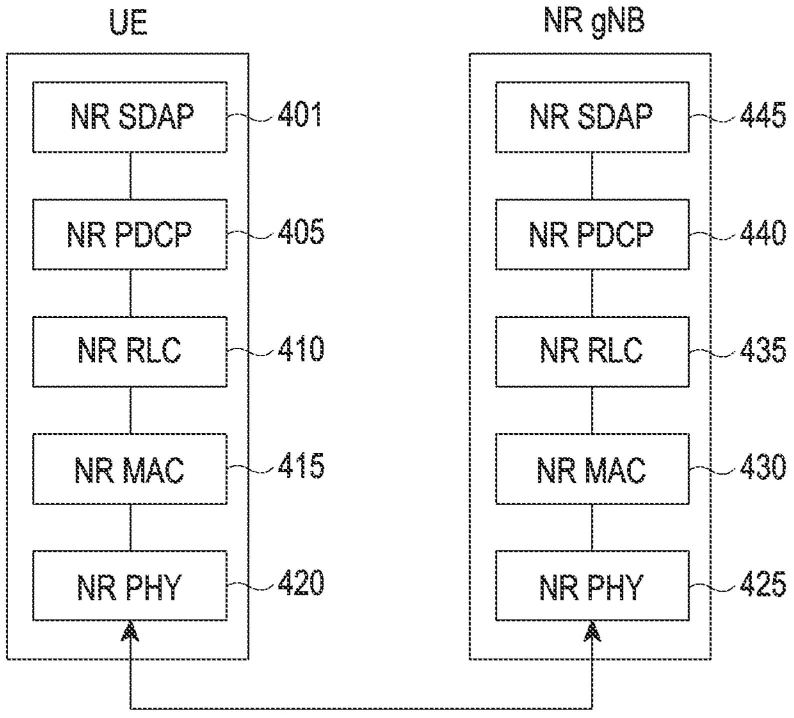
FIG. 4 is a view illustrating a structure of a radio protocol of a next-generation mobile communication system according to an embodiment of the disclosure.

FIG. 4 is a view illustrating a structure of a radio protocol of a next-generation mobile communication system according to an embodiment of the disclosure.

Referring to FIG. 3, the radio protocols for the next-generation mobile communication system include NR service data application protocols (SDAPs) 401 and 445, NR PDCPs 405 and 440, NR RLCs 410 and 435, and NR MACs 415 and 430, in a UE and an NR base station, respectively.

The main functions of the NR SDAPs 401 and 445 may include at least some of the following functions.

- Transfer of user plane data
- Mapping between a QoS flow and a DRB for both DL and UL
- Marking QoS flow ID in both DL and UL packets
- reflective QoS flow to DRB mapping for the UL SDAP PDUs For the SDAP layer device, the UE may be set, via an RRC message, for whether to use the functions of the SDAP layer or the header of the SDAP layer device per PDCP layer device, per bearer, or per logical channel. If an SDAP header has been set, the UE may be instructed to update or reset mapping information for the data bearer and QoS flow of uplink and downlink, by a one-bit non-access stratum (NAS) reflective QoS indicator and a one-bit access stratum (AS) reflective QoS indicator. The SDAP header may include QoS flow ID information indicating QoS. The QoS information may be used as data priority handling or scheduling information for seamlessly supporting a service.

The main functions of the NR PDCPs 405 and 440 may include at least some of the following functions.

- Header compression and decompression: ROHC only)
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink The reordering by the NR PDCP refers to reordering PDCP PDUs received by the lower layer based on the PDCP sequence numbers (SNs) and may include transferring the data to the higher layer in the reordered sequence or immediately without considering order, recording PDCP PDUs missed by reordering, reporting the state of the missing PDCP PDUs to the transmit part, and requesting to retransmit the missing PDCP PDUs.

The main functions of the NR RLCs 410 and 435 may include at least some of the following functions.

- Transfer of upper layer PDUs
- In-sequence delivery of upper layer PDUs
- Out-of-sequence delivery of upper layer PDUs
- Error correction through ARQ
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment The in-sequence delivery by the NR RLC device refers to transferring the RLC SDUs received from the lower layer to the higher layer in order and, if one original RLC SDU is split into several RLC SDUs that are then received, the in-sequence delivery may include reassembling and transferring them, reordering the received RLC PDUs based on the RLC SNs or PDCP SNs, recording the RLC PDUs missed by reordering, reporting the state of the missing RLC PDUs to the transmit part, and requesting to retransmit the missing RLC PDUs and, if there are missing RLC SDUs, the in-sequence delivery may include transferring only RLC SDUs before the missing RLC SDUs to the higher layer in order. Although there are missing RLC SDUs, if a predetermined timer has expired, the in-sequence delivery may include transferring all of the RLC SDUs received before the timer starts to the higher layer in order. Or, although there are missing RLC SDUs, if the predetermined timer has expired, the in-sequence delivery may include transferring all of the RLC SDUs received thus far to the higher layer in order. Further, the RLC PDUs may be processed in order of reception (in order of arrival regardless of the sequence number order) and delivered to the PDCP device regardless of order (out-of-sequence delivery). For segments, segments which are stored in a buffer or are to be received later may be received and reconstructed into a single whole RLC PDU, and then, the whole RLC PDU is processed and transferred to the PDCP device. The NR RLC layer may not include the concatenation function, and the function may be performed by the NR MAC layer or replaced with a multiplexing function of the NR MAC layer.

The out-of-sequence delivery by the NR RLC device refers to immediately transferring the RLC SDUs received from the lower layer to the higher layer regardless of order and, if one original RLC SDU is split into several RLC SDUs that are then received, the out-of-sequence delivery may include reassembling and transferring them and storing the RLC SNs or PDCP SNs of the received RLC PDUs, ordering them, and recording missing RLC PDUs.

The NR MACs 415 and 430 may be connected to several NR RLC layer devices configured in one UE, and the major functions of the NR MAC may include at least some of the following functions.

- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- Multimedia broadcast multicast services (MBMS) service identification
- Transport format selection
- Padding The NR PHY layers 420 and 425 may channel-code and modulate higher layer data into OFDM symbols, transmit the OFDM symbols through a wireless channel or demodulates OFDM symbols received through a wireless channel, channel-decodes and transfers the same to a higher layer.

Figure 5:
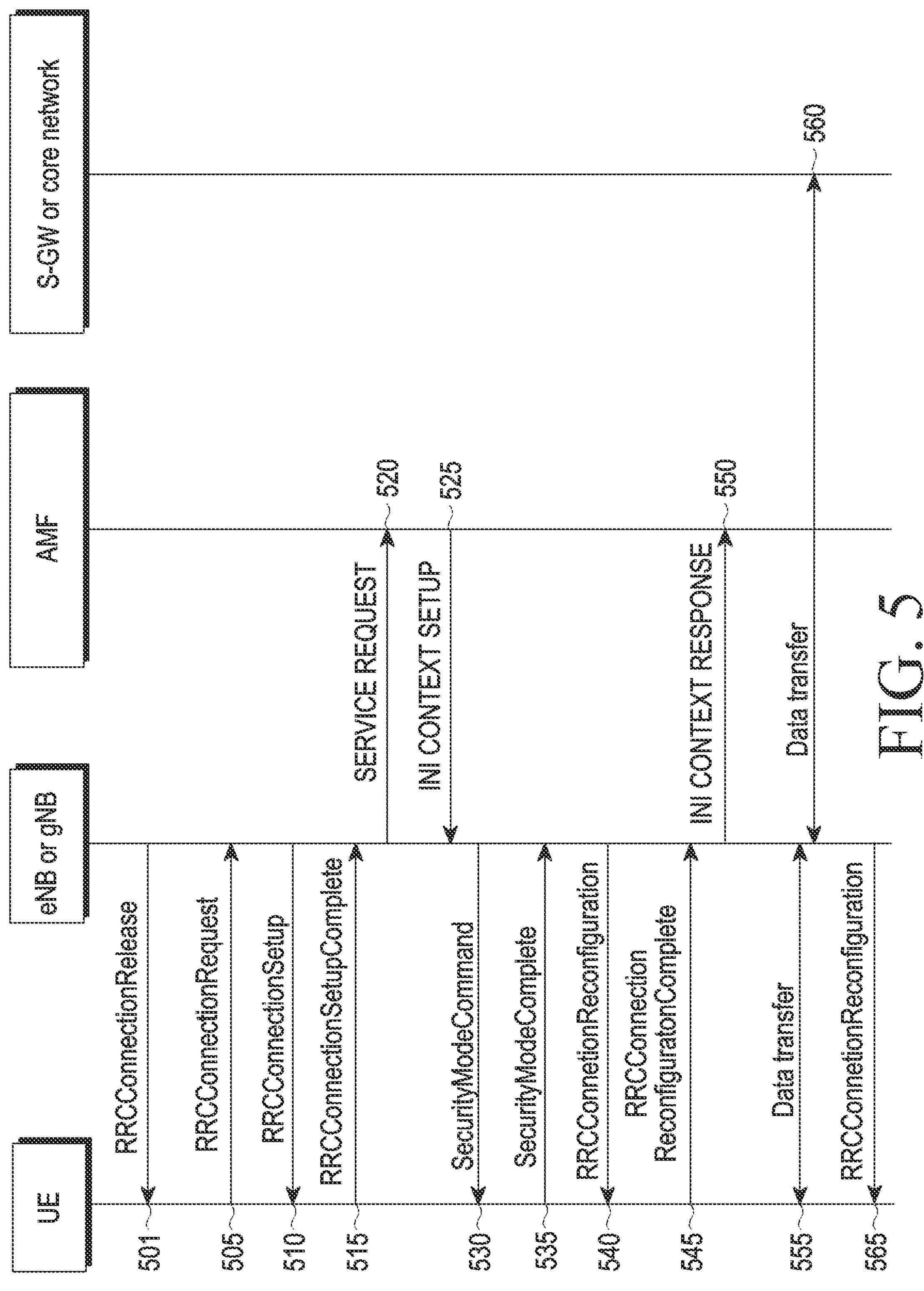
FIG. 5 is a view illustrating a procedure for performing an RRC connection setup with a base station when a UE establishes a connection with a network in a next-generation mobile communication system according to an embodiment of the disclosure.

FIG. 5 is a view illustrating a procedure for performing an RRC connection setup with a base station when a UE establishes a connection with a network in a next-generation mobile communication system according to an embodiment of the disclosure. In the embodiment of FIG. 5, the base station may be, e.g., an eNB or gNB.

Referring to FIG. 5, the base station may send an RRCConnectionRelease message to the UE when the UE that transmits and receives data in the RRC connected mode does not transmit or receive data for a predetermined cause or for a certain period of time to switch the UE to the RRC idle mode (501). In the future, if data to be transmitted is generated, a UE without connection setup (hereinafter, idle mode UE) may perform an RRC connection establishment process with the base station.

The UE establishes synchronization with the base station through a random access process and transmits an RRCConnectionRequest message to the base station (505). The RRCConnectionRequest message may include an identifier of the UE and a cause for establishing a connection (establishmentCause).

The base station transmits an RRCConnectionSetup message to allow the UE to establish an RRC connection (510). The RRCConnectionSetup message may include at least one of configuration information for each logical channel, configuration information for each bearer, PDCP layer device configuration information, RLC layer device configuration information, and MAC layer device configuration information.

The RRCConnectionSetup message may indicate to configure the PDCP layer device, RLC layer device, MAC layer device, and/or PHY layer device for the bearer corresponding to what bearer identifier (e.g., signaling radio bearer (SRB) identifier or DRB identifier). Further, the RRCConnectionSetup message may indicate whether to establish or release an LTE PDCP layer device for a bearer corresponding to what bearer identifier, and may indicate whether to establish or release an NR PDCP layer device. Further, the RRCConnectionSetup message may indicate whether to release the LTE PDCP layer device, change to the NR PDCP layer device, and connect the NR PDCP layer device with the LTE RLC layer device for a bearer corresponding to what bearer identifier. Further, the RRCConnectionSetup message may indicate whether to release the NR PDCP layer device, change to the LTE PDCP layer device, and reconnect the LTE PDCP layer device with the LTE RLC layer device for a bearer corresponding to what bearer identifier.

Further, if the RRCConnectionSetup message includes a configuration for releasing the LTE PDCP layer device corresponding to the first bearer identifier, and the RRC message does not include NR PDCP configuration information corresponding to the first bearer identifier, and the NR PDCP layer device for the first bearer identifier has already been configured, it is possible to allow the NR PDCP layer device to connect to the LTE RLC layer device that was connected to the released LTE PDCP layer device (PDCP layer device version change procedure, change from LTE PDCP to NR PDCP).

Further, if the RRCConnectionSetup message includes a configuration for releasing the NR PDCP layer device for the first bearer identifier configured as the NR PDCP layer device and the LTE RLC device are connected, and the RRC message includes LTE PDCP configuration information corresponding to the first bearer identifier, it is possible to allow the LTE PDCP layer device to connect to the LTE RLC layer device that was connected to the released NR PDCP layer device (PDCP layer device version change procedure, change from NR PDCP to LTE PDCP).

The UE that has established the RRC connection transmits an RRCConnectionSetupComplete message to the base station (515). The RRCConnectionSetupComplete message may include a control message SERVICE REQUEST in which the UE requests a bearer setup for a predetermined service from an access and mobility management function (AMF) or MME. The base station transmits the SERVICE REQUEST message contained in the RRCConnectionSetupComplete message to the AMF or MME (520). The AMF or MME may determine whether to provide the service requested by the UE.

As a result of the determination, if it is determined to provide the service requested by the UE, the AMF or MME transmits an INITIAL CONTEXT SETUP REQUEST message to the base station (525). The INITIAL CONTEXT SETUP REQUEST message may include information, such as quality of service (QoS) information to be applied when setting up a data radio bearer (DRB) and security-related information (e.g., security key, security algorithm) to be applied to the DRB.

The base station exchanges a SecurityModeCommand message 530 and a SecurityModeComplete message 535 to configure security with the UE. When security configuration is completed, the base station transmits an RRCConnectionReconfiguration message to the UE (540).

The RRCConnectionReconfiguration message may indicate to configure the PDCP layer device, RLC layer device, MAC layer device, and/or PHY layer device for the bearer corresponding to what bearer identifier (e.g., SRB identifier or DRB identifier). Further, the RRCConnectionReconfiguration message may indicate whether to establish or release an LTE PDCP layer device for a bearer corresponding to what bearer identifier, and may indicate whether to establish or release an NR PDCP layer device. Further, the RRCConnectionReconfiguration message may indicate whether to release the LTE PDCP layer device, change to the NR PDCP layer device, and connect the NR PDCP layer device with the LTE RLC layer device for a bearer corresponding to what bearer identifier. Further, the RRCConnectionReconfiguration message may indicate whether to release the NR PDCP layer device, change to the LTE PDCP layer device, and reconnect the LTE PDCP layer device with the LTE RLC layer device for a bearer corresponding to what bearer identifier.

Further, if the RRCConnectionReconfiguration message includes a configuration for releasing the LTE PDCP layer device corresponding to the first bearer identifier, and the RRC message does not include NR PDCP configuration information corresponding to the first bearer identifier, and the NR PDCP layer device for the first bearer identifier has already been configured, it is possible to allow the NR PDCP layer device to connect to the LTE RLC layer device that was connected to the released LTE PDCP layer device (PDCP layer device version change procedure, change from LTE PDCP to NR PDCP).

Further, if the RRCConnectionReconfiguration message includes a configuration for releasing the NR PDCP layer device for the first bearer identifier configured as the NR PDCP layer device and the LTE RLC device are connected, and the RRC message includes LTE PDCP configuration information corresponding to the first bearer identifier, it is possible to allow the LTE PDCP layer device to connect to the LTE RLC layer device that was connected to the released NR PDCP layer device (PDCP layer device version change procedure, change from NR PDCP to LTE PDCP).

Further, the RRCConnectionReconfiguration message may include DRB configuration information for processing user data, and the UE configures a DRB by applying the information and transmits an RRCConnectionReconfigurationComplete message to the base station (545). The base station that has completed DRB setup with the UE may transmit an INITIAL CONTEXT SETUP COMPLETE message (INI CONTEXT RESPONSE) to the AMF or MME and complete the connection (550).

When all of the above processes are completed, the UE transmits and receives data to/from the base station through the core network (555 and 560). According to an embodiment, the data transmission process is largely constituted of three steps: RRC connection setup, security setup, and DRB setup. Further, the base station may transmit an RRC Connection Reconfiguration message to update, add, or change the configuration to the UE for a predetermined cause (565).

The RRCConnectionReconfiguration message may indicate to configure the PDCP layer device, RLC layer device, MAC layer device, and/or PHY layer device for the bearer corresponding to what bearer identifier (e.g., SRB identifier or DRB identifier). Further, the RRCConnectionReconfiguration message may indicate whether to establish or release an LTE PDCP layer device for a bearer corresponding to what bearer identifier, and may indicate whether to establish or release an NR PDCP layer device. Further, the RRCConnectionReconfiguration message may indicate whether to release the LTE PDCP layer device, change to the NR PDCP layer device, and connect the NR PDCP layer device with the LTE RLC layer device for a bearer corresponding to what bearer identifier. Further, the RRCConnectionReconfiguration message may indicate whether to release the NR PDCP layer device, change to the LTE PDCP layer device, and reconnect the LTE PDCP layer device with the LTE RLC layer device for a bearer corresponding to what bearer identifier.

Further, if the RRCConnectionReconfiguration message includes a configuration for releasing the LTE PDCP layer device corresponding to the first bearer identifier, and the RRC message does not include NR PDCP configuration information corresponding to the first bearer identifier, and the NR PDCP layer device for the first bearer identifier has already been configured, it is possible to allow the NR PDCP layer device to connect to the LTE RLC layer device that was connected to the released LTE PDCP layer device (PDCP layer device version change procedure, change from LTE PDCP to NR PDCP).

Further, if the RRCConnectionReconfiguration message includes a configuration for releasing the NR PDCP layer device for the first bearer identifier configured as the NR PDCP layer device and the LTE RLC device are connected, and the RRC message includes LTE PDCP configuration information corresponding to the first bearer identifier, it is possible to allow the LTE PDCP layer device to connect to the LTE RLC layer device that was connected to the released NR PDCP layer device (PDCP layer device version change procedure, change from NR PDCP to LTE PDCP).

The connection setup procedure between the UE and the base station proposed above in the disclosure may be applied to connection setup between the UE and the LTE base station, and may also be applied to connection setup between the UE and the NR base station.

Proposed below is a first embodiment of enhancing security of data transmitted or received between a UE and a network using an integrity protection or verification procedure of the disclosure.

The first embodiment proposes an RRC configuration procedure that may support an integrity protection (or verification) function by changing the version of the PDCP layer device from the LTE PDCP layer device, which does not support integrity protection (or function), to the NR PDCP layer device supporting the integrity protection (or function) or by setting as the NR PDCP from the beginning (or by resetting to, or instructing to change to, the NR PDCP layer device) so as to enhance security using an integrity protection or verification procedure.

In the first embodiment, when enhancing security using an integrity protection or verification procedure, since the LTE PDCP layer device does not support the integrity protection or verification procedure, the version of the PDCP layer device is changed into the NR PDCP layer device that supports the integrity protection (or function) or the NR PDCP is set from the beginning (or set or reset to the NR PDCP layer device or instructed to change) so that the integrity protection (or verification) function may be supported according to the integrity protection (or verification) indicator of the NR PDCP layer device configuration information of the RRC message.

In the foregoing, the NR base station and/or LTE base station connected to the LTE system (EPC) and/or NR system may configure or support a ciphering (or deciphering) function for the SRB and/or DRB to the UE.

Further, in the foregoing, the NR base station and/or LTE base station connected to the LTE system (EPC) and/or NR system may configure and/or support an integrity protection (or verification) function for the SRB and/or DRB to the UE (or UE supporting the integrity protection or verification function (user plane integrity protection (UP IP)) for the DRB as UE capability).

Further, in the foregoing, the NR base station and/or LTE base station connected to the NR system may configure or support an integrity protection (or verification) function for the DRB to the UE.

Further, in the foregoing, the NR base station and/or LTE base station connected to the LTE system may configure or support an integrity protection (or verification) function for the DRB to the UE supporting the integrity protection or verification function (user plane integrity protection (UP IP)) for the DRB as UE capability.

Specifically, in the first embodiment, it is proposed not to configure LTE PDCP layer device configuration information (pdcp-config that may be included (or configured) in RadioResourceConfigDedicated) in the configuration information corresponding to the bearer identifier of the DRB in the bearer configuration information and/or to include NR PDCP layer device configuration information (pdcp-config that may be included (or configured) in nr-RadioBearerConfig1 and nr-RadioBearerConfig2) in the configuration information corresponding to the bearer identifier of the DRB to establish the NR PDCP layer device (or change from the LTE PDCP to NR PDCP layer device) to configure an integrity protection or verification function (integrity protection or user plane integrity protection) for the DRB and to configure and use the integrity protection or verification function (integrity protection or user plane integrity protection) in the NR PDCP layer device.

In the first embodiment, the integrity protection (or verification) indicator (IntegrityProtection) in the NR PDCP layer device configuration information (pdcp-config or pdcp-config that may be configured (or included) in nr-RadioBearerConfig1 and nr-RadioBearerConfig2) may be configured (or present) when the UE is connected to the LTE system (evolved packet core (EPC) system) or NR system (5GC core (5GC) system). As another method, in the NR PDCP layer device configuration information (pdcp-config or pdcp-config that may be configured (or included) in nr-RadioBearerConfig1 and nr-RadioBearerConfig2), as the integrity protection (or verification) indicator (integrityProtection), an indicator for the UE connected to the LTE system (evolved packet core (EPC) system) and/or LTE base station and an indicator for the UE connected to the NR system (5G core (5GC) system) and/or NR base station (or LTE base station) each may be introduced and defined so that the network may easily configure (or put into existence) the integrity protection or verification function in different UEs for each bearer according to the UE capability.

In the foregoing, the indicator (integrity protection) indicating the integrity protection or verification procedure (e.g., an indicator for the UE connected to the 5GC) may limit the base station (or network) not to configure the indicator if the UE connected to the LTE system does not support the integrity protection or verification function (user plane integrity protection (UP IP)) for the DRB as UE capability.

In the foregoing, the indicator (integrity protection) indicating the integrity protection or verification procedure may indicate activated or inactivated or enabled or not enabled for the integrity protection or verification procedure. When the indicator is included, it may indicate to activate or enable the integrity protection or verification function and, when the indicator is not included, it may indicate to inactivate or disable the integrity protection or verification function. In the first embodiment, in the LTE PDCP layer device configuration information (pdcp-config or pdcp-config that may be included (or configured) in RadioResourceConfigDedicated), the integrity protection (or verification) indicator (integrityProtection) may not be present, included, or configured.

The LTE PDCP layer device configuration information (pdcp-config or pdcp-config that may be included (or configured) in RadioResourceConfigDedicated) or the NR PDCP layer device configuration information (pdcp-config or pdcp-config that may be configured (or included) in nr-RadioBearerConfig1 and nr-RadioBearerConfig2) may be included in the RRC message (e.g., RRCConnectionReconfiguration or RRCConnectionSetup or RRCConnectionResume) and configured in the UE. The RadioResourceConfigDedicated may include configuration information of the LTE PDCP layer device, configuration information of the LTE RLC layer device, or configuration information of the LTE MAC layer device.

In the disclosure, RadioBearerConfig1 and nr-RadioBearerConfig2 may include RadioBearerConfig (in 3GPP TS 38.331) configuration information, and the bearer configuration information may include, e.g., SRB bearer configuration information and/or DRB bearer configuration information and/or bearer identifier and/or NR PDCP layer device configuration information and/or security configuration information (securityConfig), and the security configuration information may indicate the type of a security algorithm to be used in an ciphering or deciphering function and/or an integrity protection or verification function.

In the first embodiment, if the LTE PDCP layer device configuration information (pdcp-config that may be included (or configured) in RadioResourceConfigDedicated) is not configured or the LTE RLC layer device configuration information (rlc-config that may be included (or configured) in RadioResourceConfigDedicated) is configured or the NR PDCP layer device configuration information (pdcp-config that may be configured (or included) in nr-RadioBearerConfig1 and nr-RadioBearerConfig2) is included in the configuration information corresponding to the bearer identifier of the DRB when the UE receives bearer configuration information in the RRC message, the UE may establish the NR PDCP layer device (or change from the LTE PDCP to NR PDCP layer device) or establish the LTE RLC layer device and connect to the NR PDCP layer device and, when the integrity protection or verification function indicator (integrity protection) is set in the configuration information in the NR PDCP layer device or the integrity protection or verification is set to be enabled, the integrity protection or verification function may be used in the NR PDCP layer device.

In the foregoing, the detailed UE operation in the first embodiment is as follows. When receiving bearer configuration information (e.g., configuration information for adding or changing a DRB) in the RRC message, the UE may perform the following operations.

1> When the UE receives the bearer configuration information included in nr-RadioBearerConfig1 or nr-RadioBearerConfig2 in the RRC message (3GPP TS 38.331), for each bearer identifier (drb-Identity) included in the list configuration information for adding or changing the DRB as a configuration that is not part of the current UE configuration (e.g., for a procedure for establishing the DRB or a procedure for fully changing the configuration (full configuration), the UE 2> The UE may establish a PDCP layer device (e.g., NR PDCP layer device) for the bearer identifier. The NR PDCP layer device may be configured according to the NR PDCP layer device configuration information (pdcp-config that may be configured (or included) in nr-RadioBearerConfig1 and nr-RadioBearerConfig2).

2> If the PDCP layer device of the DRB is configured with an integrity protection or verification function indicator (indicator for a UE connected to 5GC or indicator for a UE connected to EPC) in NR PDCP layer device configuration information, the UE 3> The NR PDCP layer device may be configured with an integrity protection or verification algorithm according to the security configuration information configured in the RRC message, and a security key may be configured.

1> When the UE receives the bearer configuration information included in RadioResourceConfigDedicated (3GPP TS 36.331), for each bearer identifier (drb-Identity) included in the list configuration information for adding or changing the DRB as a configuration that is not part of the current UE configuration (e.g., for a procedure for establishing the DRB or a procedure for fully changing the configuration (full configuration), the UE 2> If list configuration information for adding or changing DRB for SCG is not received or does not include the bearer identifier (drb-identity), 3> If the LTE PDCP layer device configuration information (pdcp-config that may be included (or configured) in RadioResourceConfigDedicated) is received in the foregoing 4> The UE may establish a PDCP layer device (e.g., LTE PDCP layer device) for the bearer identifier. The PDCP layer device may be configured according to current security configuration information and the PDCP layer device configuration information.

3> The UE may establish a RLC layer device (e.g., LTE RLC layer device) for the bearer identifier. The RLC layer device may be configured according to the RLC layer device configuration information.

3> If the LTE PDCP layer device configuration information (pdcp-config that may be included (or configured) in RadioResourceConfigDedicated) is not received in the foregoing 4> After receiving and processing (or performing the procedure for adding or changing the DRB bearer) the bearer configuration information included in nr-RadioBearerConfig1 or nr-RadioBearerConfig2 included in the RRCConnectionReconfiguration message triggering the procedure for adding or changing the DRB bearer, or after establishing the NR PDCP layer device, the LTE RLC layer device (or MCG RLC bearer) established above may be connected to the NR PDCP layer device having the same bearer identifier value in the current UE configuration. For example, the LTE RLC layer device (e.g., MCG RLC bearer) configured for the bearer identifier may be connected to the NR PDCP layer device having the same value as the bearer identifier value.

The procedure for changing the NR PDCP layer device to the LTE PDCP layer device or the procedure for establishing the LTE PDCP layer device may be performed similarly to the method proposed above by configuring to release the NR PDCP layer device in the RRC message and including configuration information for indicating to establish the LTE PDCP layer device. For example, the LTE RLC layer device (e.g., MCG RLC bearer) may be configured to be connected to the LTE PDCP layer device.

If the UE has established the NR PDCP layer device (or change from the LTE PDCP to NR PDCP layer device) based on the NR PDCP layer device configuration information (pdcp-config that may be configured (or included) in nr-RadioBearerConfig1 and nr-RadioBearerConfig2), the UE may use a security algorithm, such as the security algorithm configured in the security configuration information included in the nr-RadioBearerConfig1 and nr-RadioBearerConfig2 configuration information, identically for all bearers (SRB or DRB) configured in the UE (or all bearers (SRB or DRB) belonging to the same PDU session as the bearer where the NR PDCP layer device has been configured).

As another method, if the UE has established the NR PDCP layer device (or change from the LTE PDCP to NR PDCP layer device) based on the NR PDCP layer device configuration information (pdcp-config that may be configured (or included) in nr-RadioBearerConfig1 and nr-RadioBearerConfig2), a security algorithm, such as the security algorithm configured in the security configuration information included in the nr-RadioBearerConfig1 and nr-RadioBearerConfig2 configuration information, may be configured in the UE, and be used identically for all bearers (SRB or DRB) where the integrity protection or verification function has been configured (or all bearers (SRB or DRB) belonging to the same PDU session as the bearer where the NR PDCP layer device has been configured).

The first embodiment of the disclosure may be performed (or configured or used) when the bearer is first configured, when the bearer is reconfigured or reestablished through handover, or when the RRC connection is reconfigured (first RRCReconfiguration) for the first time after the RRC connection reestablishment procedure.

In the disclosure, if an NR PDCP layer device is configured for a certain bearer (SRB or DRB) (or at least one bearer (SRB and/or DRB)) and an integrity protection or verification function is configured for the UE connected to the LTE system (EPC) or the LTE base station or the UE connected to the NR system (5GC) or the LTE base station through the first embodiment proposed above, the base station or the UE may configure NR PDCP layer device configuration information for all bearers configured in the UE (or all bearers belonging to the same PDU session as the bearer) to configure the NR PDCP layer device and, in the foregoing case, may limit the bearers not to configure the LTE PDCP layer device configuration information (the complexity of UE implementation may be reduced by the method). For example, for one UE connected to the EPC or LTE base station (or UE connected to the NR system (5GC) or LTE base station) or one PDU session of one UE, the configuration may be limited to configure the integrity protection or verification function for a certain bearer while not permitting to configure the integrity protection or verification function for another bearer. For example, for one UE connected to the EPC or LTE base station (or UE connected to the NR system (5GC) or LTE base station) or one PDU session of one UE, all or none of the bearers may be configured with the integrity protection or verification function.

As another method, in the disclosure, the NR PDCP layer device or the LTE PDCP layer device may be configured for each bearer (SRB or DRB) through the first embodiment proposed above to the UE connected to the EPC or LTE base station (or the UE connected to the NR system (5GC) or the LTE base station), and the integrity protection or verification function may be configured or not configured to increase the degree of freedom of implementation of the base station.

In the disclosure, when configuring the integrity protection or verification function for the DRB (or user plane data) to the UE connected to the EPC or LTE base station or NR base station (or UE connected to the NR system (5GC) or LTE base station), the base station may include the bearer configuration information in the RRC message as proposed in the first embodiment, to the UE supporting the integrity protection or verification function as UE capability (or reported to support it as UE capability), for the DRB (or user plane data) in the LTE system (EPC) or LTE base station or NR base station, does not configure the LTE PDCP layer device configuration information (pdcp-config that may be included (or configured) in RadioResourceConfigDedicated) in the configuration information corresponding to the bearer identifier of the DRB or include the LTE RLC layer device configuration information (rlc-config that may be included (or configured) in RadioResourceConfigDedicated) or include the NR PDCP layer device configuration information (pdcp-config that may be configured (or included) in nr-RadioBearerConfig1 and nr-RadioBearerConfig2) in the configuration information corresponding to the bearer identifier of the DRB to thereby establish the NR PDCP layer device (or change from the LTE PDCP to NR PDCP layer device) or establish the LTE RLC layer device, connect to the NR PDCP layer device, configure the integrity protection or verification function indicator (integrity protection) (e.g., the indicator for the UE connected to EPC) in the NR PDCP layer device configuration information so that the integrity protection or verification function may be used in the NR PDCP layer device.

In the disclosure, when not configuring the integrity protection or verification function to the UE connected to the EPC or 5GC or LTE base station, the base station may include the bearer configuration information in the RRC message as proposed in the first embodiment, not configure the LTE PDCP layer device configuration information (pdcp-config that may be included (or configured) in RadioResourceConfigDedicated) or include the LTE RLC layer device configuration information (rlc-config that may be included (or configured) in RadioResourceConfigDedicated) or include the NR PDCP layer device configuration information (pdcp-config that may be configured (or included) in nr-RadioBearerConfig1 and nr-RadioBearerConfig2) in the configuration information corresponding to the bearer identifier of the DRB, to thereby establish the NR PDCP layer device (or change from the LTE PDCP to NR PDCP layer device) or establish the LTE RLC layer device and connect to the NR PDCP layer device and not configure the integrity protection or verification function indicator (integrity protection) in the configuration information of the NR PDCP layer device so that the integrity protection or verification function is not used in the NR PDCP layer device. As another method, the base station may include bearer configuration information to configure the LTE PDCP layer device in the foregoing.

In the disclosure, when configuring the integrity protection or verification function for the DRB (or user plane data) to the UE connected to the 5GC or LTE base station or NR base station, the base station may include the bearer configuration information in the RRC message as proposed in the first embodiment, to the UE supporting the integrity protection or verification function as UE capability (or reported to support it as UE capability), for the DRB (or user plane data) in the NR system (5GC) or LTE base station or NR base station, does not configure the LTE PDCP layer device configuration information (pdcp-config that may be included (or configured) in RadioResourceConfigDedicated) in the configuration information corresponding to the bearer identifier of the DRB or include the LTE RLC layer device configuration information (rlc-config that may be included (or configured) in RadioResourceConfigDedicated) or include the NR PDCP layer device configuration information (pdcp-config that may be configured (or included) in nr-RadioBearerConfig1 and nr-RadioBearerConfig2) in the configuration information corresponding to the bearer identifier of the DRB to thereby establish the NR PDCP layer device (or change from the LTE PDCP to NR PDCP layer device) or establish the LTE RLC layer device, connect to the NR PDCP layer device, configure the integrity protection or verification function indicator (integrity protection) (e.g., the indicator for the UE connected to GC) in the NR PDCP layer device configuration information so that the integrity protection or verification function may be used in the NR PDCP layer device.

In the disclosure, when configuring the integrity protection or verification function to the UE connected to the EPC or LTE base station or NR base station, the base station may include the bearer configuration information in the RRC message as proposed in the first embodiment, not configure the LTE PDCP layer device configuration information (pdcp-config that may be included (or configured) in RadioResourceConfigDedicated) or include the LTE RLC layer device configuration information (rlc-config that may be included (or configured) in RadioResourceConfigDedicated) or include the NR PDCP layer device configuration information (pdcp-config that may be configured (or included) in nr-RadioBearerConfig1 and nr-RadioBearerConfig2) in the configuration information corresponding to the bearer identifier of the DRB, to thereby establish the NR PDCP layer device (or change from the LTE PDCP to NR PDCP layer device) or establish the LTE RLC layer device and connect to the NR PDCP layer device and configure the integrity protection or verification function indicator (integrity protection) (e.g., an indicator for the UE connected to the EPC) in the configuration information of the NR PDCP layer device so that the integrity protection or verification function may be used in the NR PDCP layer device.

In the disclosure, the bearer may include SRB and DRB, SRB stands for signaling radio bearer, and DRB stands for data radio bearer. UM DRB refers to a DRB using an RLC layer device operating in an unacknowledged mode (UM), and AM DRB refers to a DRB using an RLC layer device operating in an acknowledged mode (AM). Further, the procedure for changing the version of the PDCP layer device proposed in the disclosure may be applied to all cases where the NR PDCP is changed to the LTE PDCP or the LTE PDCP is changed to the NR PDCP, may be applied to the DRB, or may be applied to the SRB. In other words, it may be applied to the PDCP version change procedure for the DRB, and if necessary, it may be extended and applied to the PDCP version change procedure for the SRB. Furthermore, the UE may receive, from the LTE base station or the NR base station, an RRC message indicating the procedure for changing the version of the PDCP layer device.

Figure 6:
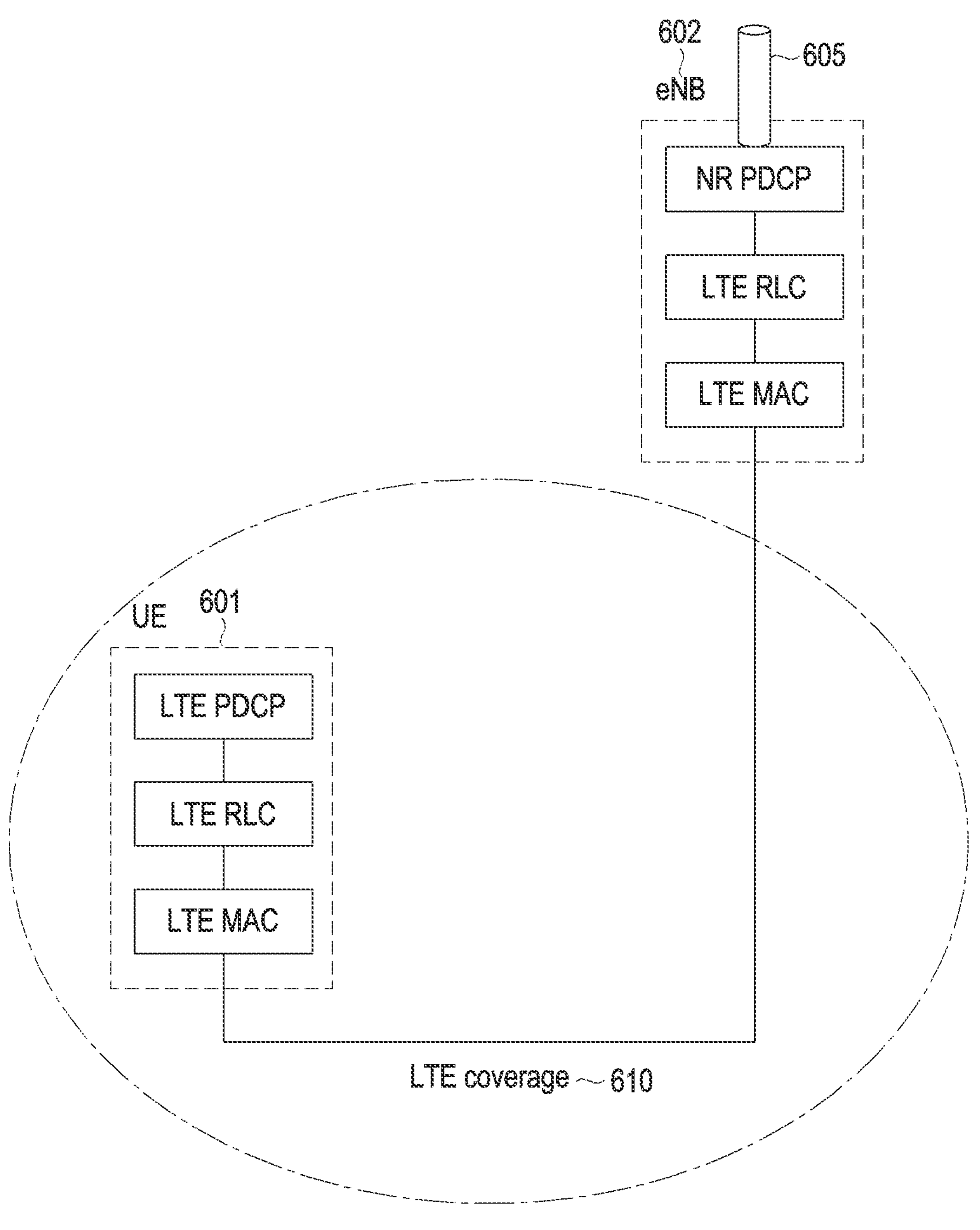
FIG. 6 is a view illustrating a protocol structure in which a UE establishes a connection with an LTE base station and transmits/receives data according to an embodiment of the disclosure.

FIG. 6 is a view illustrating a protocol structure in which a UE establishes a connection with an LTE base station and transmits/receives data according to an embodiment of the disclosure.

In FIG. 6, if the UE 601 is in the LTE cell coverage 610 supported by the LTE base station, an RRC connection may be established with the LTE base station 602 and data on the first bearer 605 may be transmitted and received as described with reference to FIG. 5. In the foregoing, the downlink data for the first bearer 605 is processed through the LTE PDCP layer device, the LTE RLC layer device, the LTE MAC layer device, and the LTE PHY layer device of the LTE base station, and is transmitted through a radio link and is received by the LTE PHY layer device, the LTE MAC layer device, the LTE RLC layer device, and the LTE PDCP layer device of the UE and processed. In the foregoing, the uplink data for the first bearer 605 is processed through the LTE PDCP layer device, the LTE RLC layer device, the LTE MAC layer device, and the LTE PHY layer device of the UE, and is transmitted through a radio link and is received by the LTE PHY layer device, the LTE MAC layer device, the LTE RLC layer device, and the LTE PDCP layer device of the LTE base station and processed.

Figure 7:
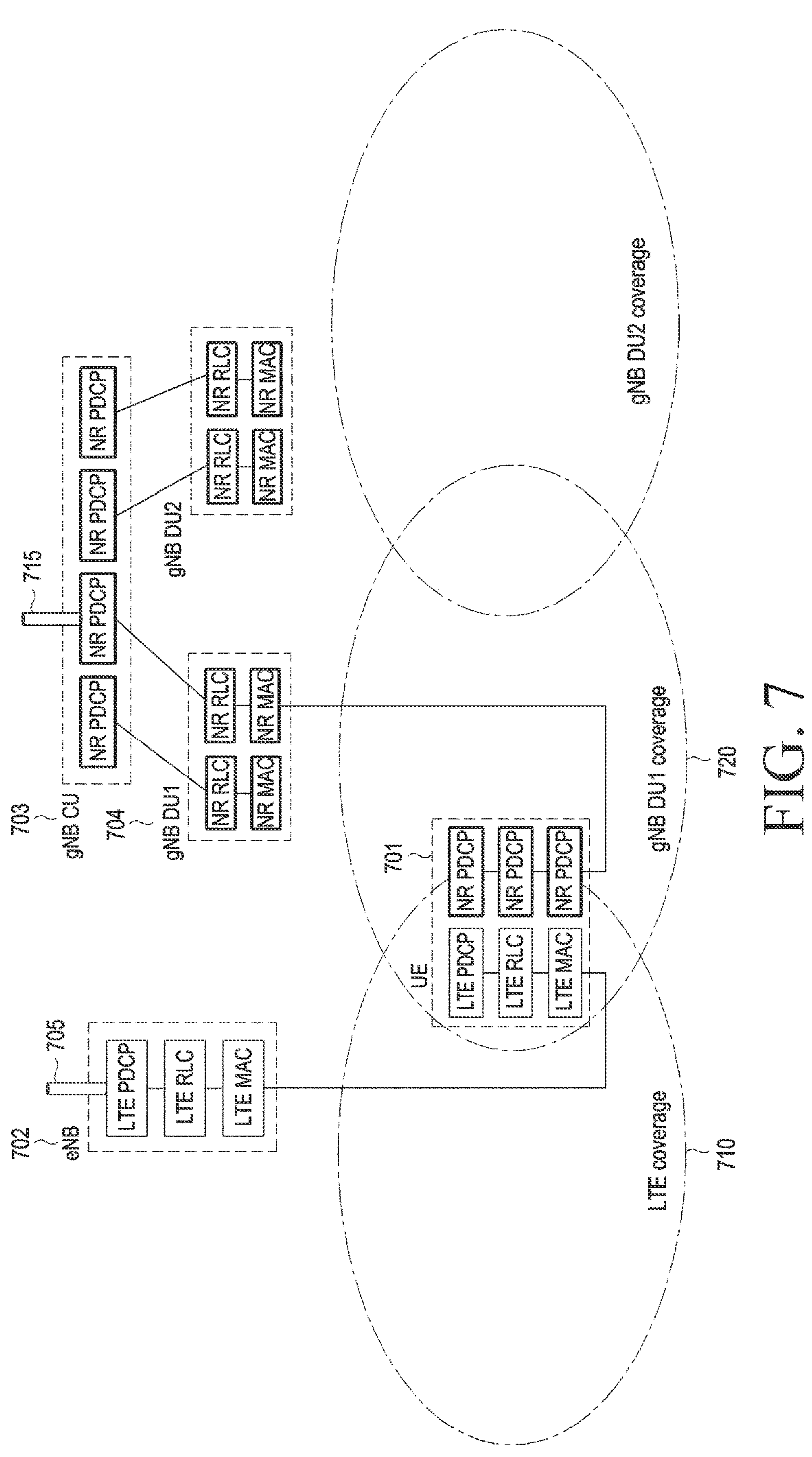
FIG. 7 is a view illustrating a protocol structure in which a UE establishes a connection with an LTE base station, establishes a connection with an NR base station, and transmits/receives data according to an embodiment of the disclosure.

FIG. 7 is a view illustrating a protocol structure in which a UE establishes a connection with an LTE base station, establishes a connection with an NR base station, and transmits/receives data according to an embodiment of the disclosure.

In the disclosure, the NR base station may have a central unit (CU)-distributed unit (DU) split structure. In other words, the CU 703 may operate the SDAP layer device or the PDCP layer device, and the DU 704 connected wiredly may operate the RLC layer device, the MAC layer device, and the PHY layer device.

In FIG. 7, if the UE 701 is in the LTE cell coverage 710 supported by the LTE base station 702, an RRC connection may be established with the LTE base station 702 and data on the first bearer 705 may be transmitted and received as described with reference to FIG. 5. Further, if the UE 701 is in the NR cell coverage 720 supported by the NR base stations 703 and 704, an RRC connection may be established with the NR base stations 703 and 704 and data on the second bearer 715 may be transmitted and received as described with reference to FIG. 5.

In the foregoing, the downlink data for the second bearer 715 is processed through the NR PDCP layer device, the NR RLC layer device, the NR MAC layer device, and the NR PHY layer device of the NR base station, and is transmitted through a radio link and is received by the NR PHY layer device, the NR MAC layer device, the NR RLC layer device, and the NR PDCP layer device of the UE and processed. In the foregoing, the uplink data for the second bearer 715 is processed through the NR PDCP layer device, the NR RLC layer device, the NR MAC layer device, and the NR PHY layer device of the UE, and is transmitted through a radio link and is received by the NR PHY layer device, the NR MAC layer device, the NR RLC layer device, and the NR PDCP layer device of the NR base station and processed.

However, as described with reference to FIG. 7, when the UE simultaneously establishes RRC connection to the LTE base station and the NR base station and transmits and receives data, if the first bearer 705 is managed by the LTE base station and the second bearer 715 is managed by the NR base station, network operation may be complicated. This is because, in order for two different base stations (LTE base station and NR base station) to together perform data traffic management for one UE, control signals should be exchanged between the base stations, resulting in transmission delay and difficulty in management. Accordingly, the version of the PDCP layer device may be changed or reset through the first embodiment proposed in the disclosure. For example, the LTE PDCP layer device may be changed to the NR PDCP layer device, or the NR PDCP layer device may be changed to the LTE PDCP layer device.

Therefore, proposed below is a method and device in which when the UE is simultaneously connected to the next-generation mobile communication base station (NR base station) and LTE base station, the network may operate more transmission resources and change the LTE PDCP layer device that processes data serviced through the LTE base station into the NR PDCP layer device of the next-generation mobile communication system to allow the NR base station to manage all traffic of the UE. Accordingly, the version of the PDCP layer device may be changed or reset through the first embodiment proposed in the disclosure. For example, the LTE PDCP layer device may be changed to the NR PDCP layer device, or the NR PDCP layer device may be changed to the LTE PDCP layer device.

Figure 8:
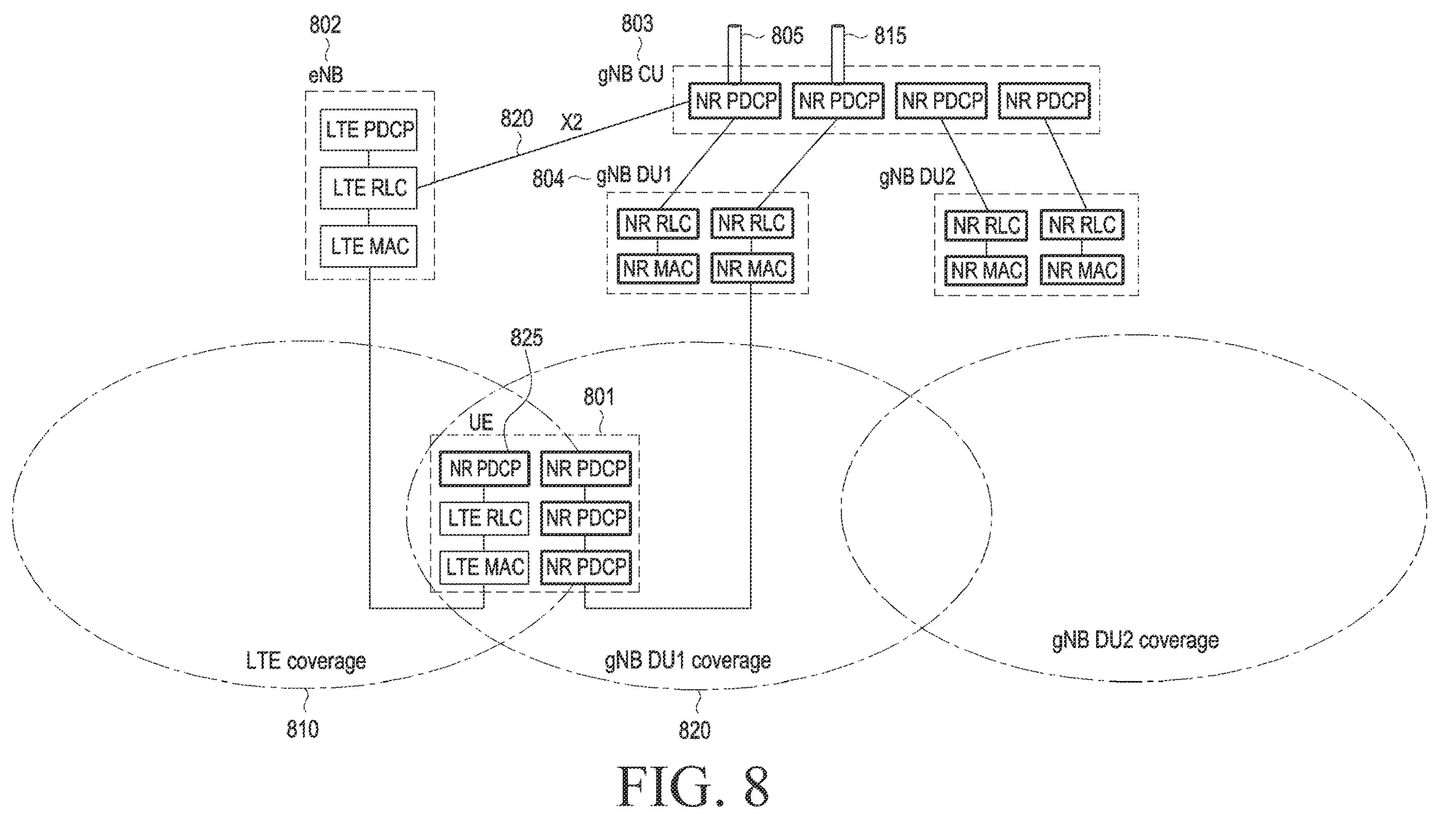
FIG. 8 is a view illustrating a protocol structure in which a UE changes the version of a PDCP layer device when establishing a connection with an LTE base station and establishing a connection with an NR base station and transmits/receives data according to an embodiment of the disclosure.

FIG. 8 is a view illustrating a protocol structure in which a UE changes the version of a PDCP layer device when establishing a connection with an LTE base station and establishing a connection with an NR base station and transmits/receives data according to an embodiment of the disclosure.

In FIG. 8, if the UE 801 is in the LTE cell coverage 810 supported by the LTE base station 802, an RRC connection may be established with the LTE base station 802 and data on the first bearer 805 may be transmitted and received as described with reference to FIG. 5. Further, if the UE 801 is in the NR cell coverage 820 supported by the NR base stations 803 and 804, as described with reference to FIG. 5, the RRC connection with the NR base stations 803 and 804 may be configured and, when the RRC connection is established, the LTE PDCP layer device for the first bearer 805 may be released, and the NR PDCP layer device may be newly configured so that the NR PDCP layer device is connected to the LTE RLC layer device of the first bearer to transmit/receive data. Further, the second bearer 815 may be configured and data may be transmitted and received.

In the foregoing, the downlink data for the first bearer 805 is processed through the NR PDCP layer device of the NR base station, the inter-base station interface (e.g., X2 interface 820), the LTE RLC layer device, the LTE MAC layer device, and the LTE PHY layer device of the LTE base station, and is transmitted through a radio link and is received by the LTE PHY layer device, the LTE MAC layer device, the LTE RLC layer device, and the NR PDCP layer device of the UE and processed. In the foregoing, the uplink data for the first bearer 805 is processed through the NR PDCP layer device, the LTE RLC layer device, the LTE MAC layer device, and the LTE PHY layer device of the UE, and is transmitted through a radio link and is received by the LTE PHY layer device, the LTE MAC layer device, the LTE RLC layer device, the inter-base station interface (e.g., X2 interface 820), and the NR PDCP layer device of the NR base station and processed.

In the foregoing, the downlink data for the second bearer 815 is processed through the NR PDCP layer device, the NR RLC layer device, the NR MAC layer device, and the NR PHY layer device of the NR base station, and is transmitted through a radio link and is received by the NR PHY layer device, the NR MAC layer device, the NR RLC layer device, and the NR PDCP layer device of the UE and processed. In the foregoing, the uplink data for the second bearer 815 is processed through the NR PDCP layer device, the NR RLC layer device, the NR MAC layer device, and the NR PHY layer device of the UE, and is transmitted through a radio link and is received by the NR PHY layer device, the NR MAC layer device, the NR RLC layer device, and the NR PDCP layer device of the NR base station and processed.

Therefore, because the NR base station is able to manage all bearers or all data traffic for the UE as in 805 and 815, unnecessary signaling between the LTE base station and the NR base station may be prevented, and one base station may efficiently manage the traffic of the UE.

Figure 9:
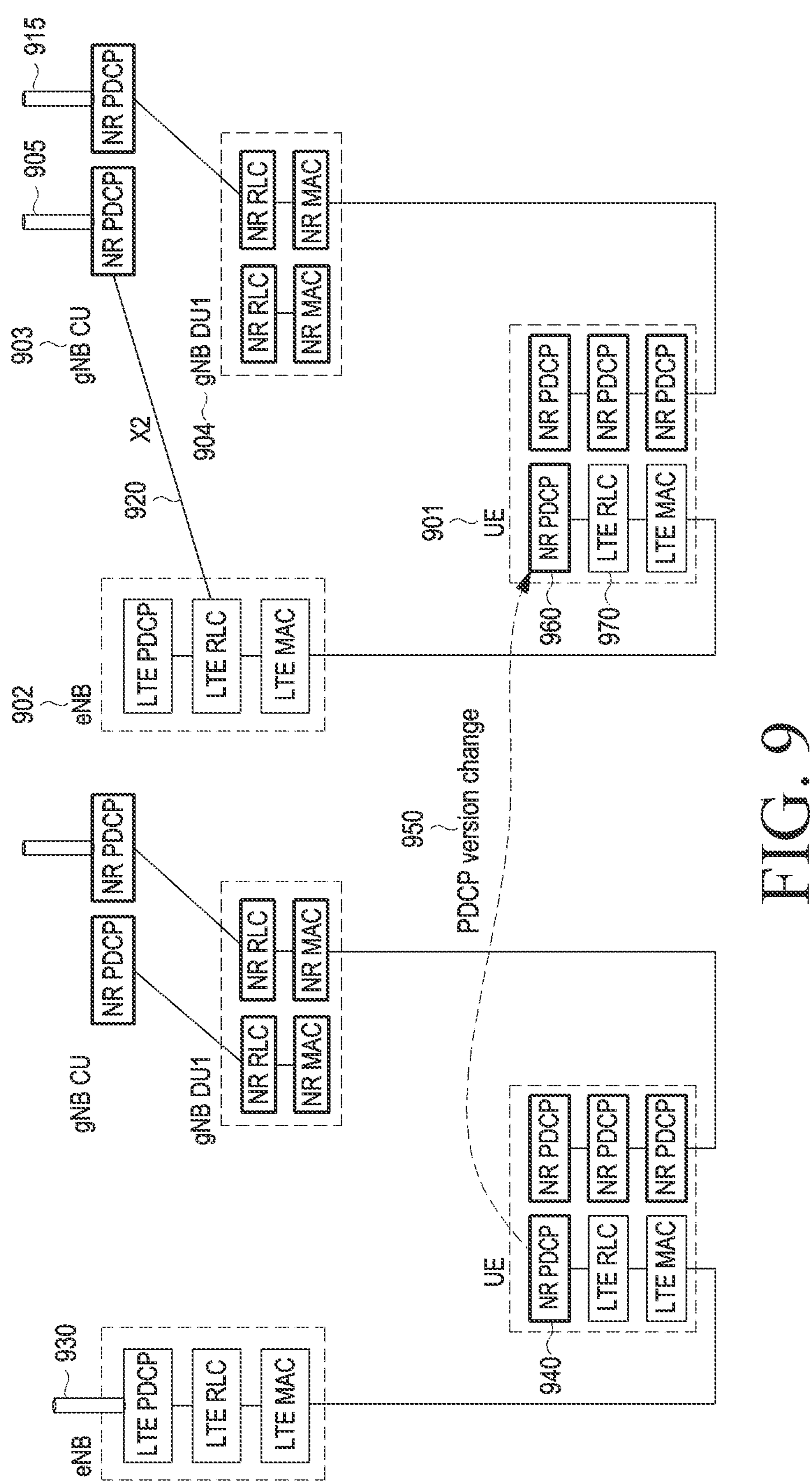
FIG. 9 is a view illustrating a procedure in which a UE changes the version of a PDCP layer device when establishing a connection with an LTE base station and establishing a connection with an NR base station according to an embodiment of the disclosure.

FIG. 9 is a view illustrating a procedure in which a UE changes the version of a PDCP layer device when establishing a connection with an LTE base station and establishing a connection with an NR base station according to an embodiment of the disclosure.

In FIG. 9, if the UE 601 is in the LTE cell coverage supported by the LTE base station, an RRC connection may be established with the LTE base station and data on the first bearer 930 may be transmitted and received as described with reference to FIG. 5. Further, if the UE is in the NR cell coverage supported by the NR base stations 903 and 904, as described with reference to FIG. 5, the RRC connection with the NR base stations 803 and 804 may be configured and, when the RRC connection is established or the RRC message is received from the LTE base station, the LTE PDCP layer device 940 for the first bearer 930 may be released, and the NR PDCP layer device 960 may be newly configured so that the NR PDCP layer device 960 is connected to the LTE RLC layer device 970 of the first bearer to transmit/receive data (950).

Accordingly, the NR base station may manage the first bearer 930 which used to be managed by the LTE base station, as the first bearer 905 in the NR base station and may be managed together with the second bearer 915. The NR base station may transmit and receive data on the first bearer through the inter-base station interface 920.

As described above in the disclosure, when the UE connected to the LTE base station and NR base station departs from the NR cell coverage or releases the connection to the NR base station by an instruction from the network, the PDCP version may be changed so that the NR PDCP layer device which was connected to the LTE RLC layer device is changed back to the LTE PDCP layer device. In other words, the procedure 950 may be performed in the opposite direction according to the RRC message indication. The version of the PDCP layer device may be changed or reset through the first embodiment proposed in the disclosure. For example, the LTE PDCP layer device may be changed to the NR PDCP layer device, or the NR PDCP layer device may be changed to the LTE PDCP layer device.

Prior to proposing a specific version change method for a PDCP layer device in the disclosure, a data processing process by a UE will first be described in FIG. 10.

Figure 10:
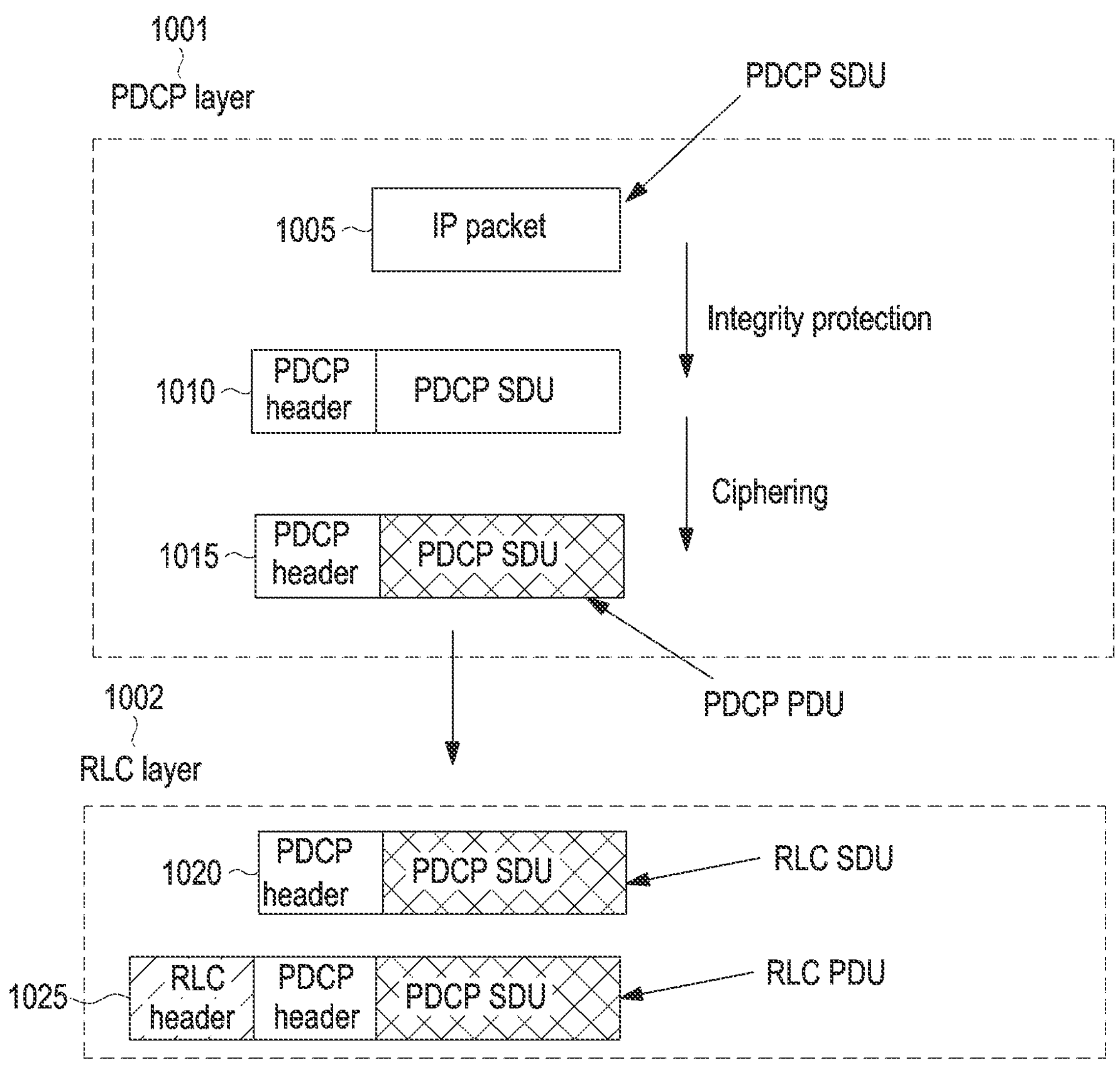
FIG. 10 is a view illustrating a procedure of processing data in a PDCP layer device and RLC layer device of a UE according to an embodiment of the disclosure.

FIG. 10 is a view illustrating a procedure of processing data in a PDCP layer device and RLC layer device of a UE according to an embodiment of the disclosure.

In FIG. 10, if the PDCP layer device of the UE receives data (e.g., the IP packet or the PDCP SDU 1005) from the higher layer device, the PDCP layer device of the UE may apply the integrity protection procedure to the PDCP SDU and the PDCP header by using the security key configured from the base station (1010). By applying the ciphering procedure with the security key only to the PDCP SDU, the PDCP PDU 1015 may be configured and transferred to a lower layer device (e.g., the RLC layer device 1002).

If the RLC layer device of the UE receives the RLC SDU (or PDCP PDU 1020) from the higher layer device (e.g., the PDCP layer device 1001), the RLC layer device of the UE may generate the RLC header corresponding thereto, may configure the RLC PDU, and may transfer it to the lower layer device.

Figure 11:
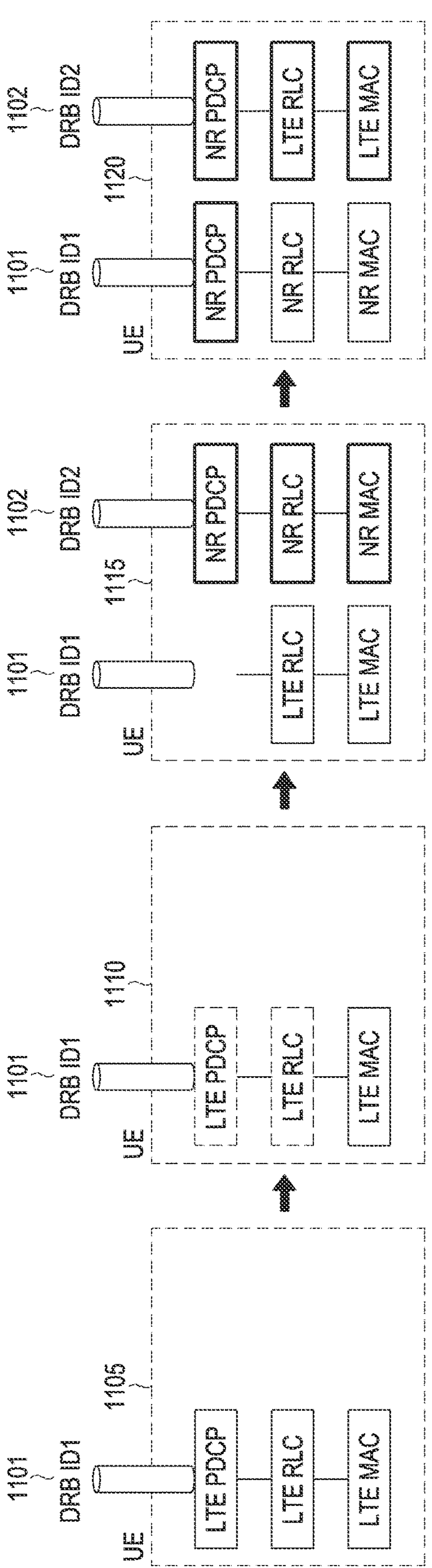
FIG. 11 is a view illustrating a method for changing the version of a PDCP layer device proposed according to an embodiment of the disclosure, wherein the method for changing the version of the PDCP layer device may be applied when changing an LTE PDCP layer device into an NR PDCP layer device or when changing an NR PDCP layer device into an LTE PDCP layer device.

FIG. 11 is a view illustrating a method for changing the version of a PDCP layer device according to an embodiment of the disclosure. The method for changing the version of the PDCP layer device may be applied when changing an LTE PDCP layer device into an NR PDCP layer device or when changing an NR PDCP layer device into an LTE PDCP layer device;

In FIG. 11, the UE may receive the RRC message from the LTE base station or the NR base station. If the RRC message indicates a version change of the PDCP layer device for a certain bearer, e.g., if the RRC message including a configuration for releasing the LTE PDCP device corresponding to the first bearer identifier 1101 does not include NR PDCP configuration information corresponding to the first bearer identifier, and the NR PDCP for the first bearer identifier has already been configured (when the LTE PDCP layer device of a certain bearer is changed to the NR PDCP layer device) or the RRC message including a configuration for releasing the NR PDCP device for the first bearer identifier where the NR PDCP device and LTE RLC device have been configured includes LTE PDCP configuration information corresponding to the first bearer identifier (when changing the NR PDCP layer device of a certain bearer to the LTE PDCP layer device), the following procedure may be performed.

As described above, if the UE receives RRC messages from the LTE base station or NR base station and is instructed to change the version of the PDCP layer device of a certain bearer, the following procedures are performed.

1. If the UE is instructed to change the version of the PDCP layer device for the first bearer through the RRC message (1105)

A. identifies the bearer identifier and discards all data (e.g., PDCP SDU and/or PDCP PDU) stored in the current PDCP layer device (e.g., LTE PDCP layer device or NR PDCP layer device) corresponding to the bearer identifier (1110).

B. after discarding all data stored in the current PDCP layer device (e.g., LTE PDCP layer device or NR PDCP layer device), releases the configuration for the current PDCP layer device (e.g., releases stored status variable values or timer value or COUNT value or ROHC configuration) and releases the PDCP layer device for the bearer identifier (1110).

C. further identifies the bearer identifier and discards all data (e.g., RLC SDU and/or RLC PDU) stored in the current RLC layer device (e.g., LTE RLC layer device) corresponding to the bearer identifier (1110).

D. applies the configuration of the new PDCP layer device (e.g., NR PDCP layer device or LTE PDCP layer device) indicated with a new configuration and included in the RRC message to establish a new PDCP layer device (e.g., NR PDCP layer device or LTE PDCP layer device) for the bearer identifier (1115).

E. after discarding the data stored in the current RLC layer device (e.g., LTE RLC layer device), releases the configuration for the current RLC layer device (e.g., releases stored status variable values or timer value) and releases the PDCP layer device for the bearer identifier. newly establishes the RLC layer device for the bearer identifier according to the configuration of the RLC layer device included in the RRC message (1115).

F. further releases the current data traffic channel identifier (DTCH) corresponding to the bearer identifier in the MAC layer device corresponding to the bearer identifier and may newly configure the new data traffic channel identifier included in the RRC message in the MAC layer device (1115).

G. connects the PDCP layer device (e.g., NR PDCP layer device or LTE PDCP layer device) newly configured for the bearer identifier to the RLC layer device (e.g., LTE RLC layer device) or MAC layer device and may complete the PDCP layer device version change procedure (1120). Then, the newly configured PDCP layer device starts transmission.

In the network, the UE may access the next-generation mobile communication base station or an LTE base station to receive the service. In the network, the UE may access the next-generation mobile communication base station or LTE base station to receive support for a service. However, when the UE is simultaneously connected to the next-generation mobile communication base station and LTE base station, the network may operate more transmission resources and requires a procedure for changing the LTE PDCP layer device that processes data serviced through the LTE base station into the NR PDCP layer device of the next-generation mobile communication system to allow the next-generation mobile communication base station (NR base station) with enhanced performance to manage all traffic of the UE. Further, data loss may occur when the LTE PDCP layer device is changed into the NR PDCP layer device or when the NR PDCP layer device is changed into the LTE PDCP layer device due to a change of the PDCP layer device between the two different systems. On the contrary, if the UE (non-standalone (NSA)) simultaneously connected to the NR base station and the LTE base station loses connection with the NR base station and receives service only from the LTE base station, a procedure for changing the NR PDCP layer device back into the LTE PDCP layer device is required and, during this course, data loss may occur. In other words, since all the stored data (e.g., PDCP SDU and/or PDCP PDU) are discarded and a new PDCP layer device is configured in the process of releasing the PDCP layer device currently configured, in step 1110 which is the change procedure step for the PDCP layer device as shown in FIG. 11, data loss may occur for the first bearer.

Therefore, proposed is a procedure for a PDCP layer device that may prevent data loss when the UE receives the RRC message from the LTE base station or NR base station and is instructed to change the LTE PDCP layer device to the NR PDCP layer device for the bearer having the same bearer identifier, or is instructed to change the NR PDCP layer device to the LTE PDCP layer device, or is instructed to change the LTE PDCP layer device to the NR PDCP layer device according to the first embodiment for enhancing the security of data transmitted/received between the UE and the network proposed in the disclosure, or is instructed to change the NR PDCP layer device to the LTE PDCP layer device or the NR PDCP layer device is established or the LTE PDCP layer device is established. Specifically, before the version of the PDCP layer device is changed, the UE transfers the data (e.g., PDCP SDU) stored in the pre-change PDCP layer device (e.g., LTE PDCP layer device) to the newly changed PDCP layer device (e.g., NR PDCP layer device) or newly stores data in the newly changed PDCP layer device (e.g., NR PDCP layer device) or regards data as data newly received by the newly changed PDCP layer device (e.g., NR PDCP layer device) to process data. In the foregoing, it may be instructed to change the LTE PDCP layer device to the NR PDCP layer device for the bearer having the same bearer identifier (first bearer identifier (eps-BearerIdentity) or second bearer identifier (drb-Identity)) or different bearer identifier (first bearer identifier (eps-BearerIdentity) or second bearer identifier (drb-Identity)), or it may be instructed to change the NR PDCP layer device to the LTE PDCP layer device. For example, although the first bearer identifier (eps-BearerIdentity) is the same, the value of the second bearer identifier (drb-Identity) corresponding to the previously configured LTE PDCP (or LTE RLC) may be set to be different from or identical to the value of the second bearer identifier (drb-Identity) corresponding to the newly configured NR PDCP, or although the first bearer identifier (eps-BearerIdentity) is the same, the value of the second bearer identifier (drb-Identity) corresponding to the previously configured NR PDCP (or LTE RLC) may be set to be different from or identical to the second bearer identifier (drb-Identity) corresponding to the newly configured LTE PDCP.

In the foregoing, what data among the data (e.g., PDCP SDUs) stored in the pre-change PDCP layer device (e.g., LTE PDCP layer device) is to be transferred and stored to the newly changed PDCP layer device (e.g., NR PDCP layer device) may be performed by one of the following methods.

First embodiment: All data (e.g., PDCP SDUs) stored in the pre-change PDCP layer device (e.g., LTE PDCP layer device or NR PDCP layer device) is transferred and stored to the newly changed PDCP layer device (e.g., NR PDCP layer device or LTE PDCP layer device) to be processed as new data, and is transferred to the lower layer device to perform transmission.

Second embodiment (cumulative retransmission): All data that have values larger than or equal to the PDCP serial number or COUNT value of the first data for which successful transfer is not acknowledged (RLC NACK) from the RLC layer devices (RLC status PDUs) connected with the pre-change PDCP layer device among the data (e.g., PDCP SDUs) stored in the pre-change PDCP layer device (e.g., LTE PDCP layer device or NR PDCP layer device) are transferred or stored to the newly changed PDCP layer device (e.g., NR PDCP layer device or LTE PDCP layer device) in ascending order or all data received from the higher layer device later than the first data are transferred and stored in order to the newly changed PDCP layer device to be regarded as new data and are transferred to the lower layer device to perform transmission.

Third embodiment (selective retransmission): Only data for which successful transfer is not acknowledged (RLC NACK) from the radio link control (RLC) layer devices (RLC status PDUs) connected with the pre-change PDCP layer device among the data (e.g., PDCP SDUs) stored in the pre-change PDCP layer device (e.g., LTE PDCP layer device or NR PDCP layer device) are transferred or stored to the newly changed PDCP layer device (e.g., NR PDCP layer device or LTE PDCP layer device) in ascending order of PDCP serial number or COUNT value or in order of reception from the higher layer device to be regarded as new data and are transferred to the lower layer device to perform transmission.

As another method, whether successful transfer of data is acknowledged by the PDCP layer device may be identified by the PDCP status report of the PDCP layer device as well as by the RLC status report of the RLC layer device.

Figure 12:
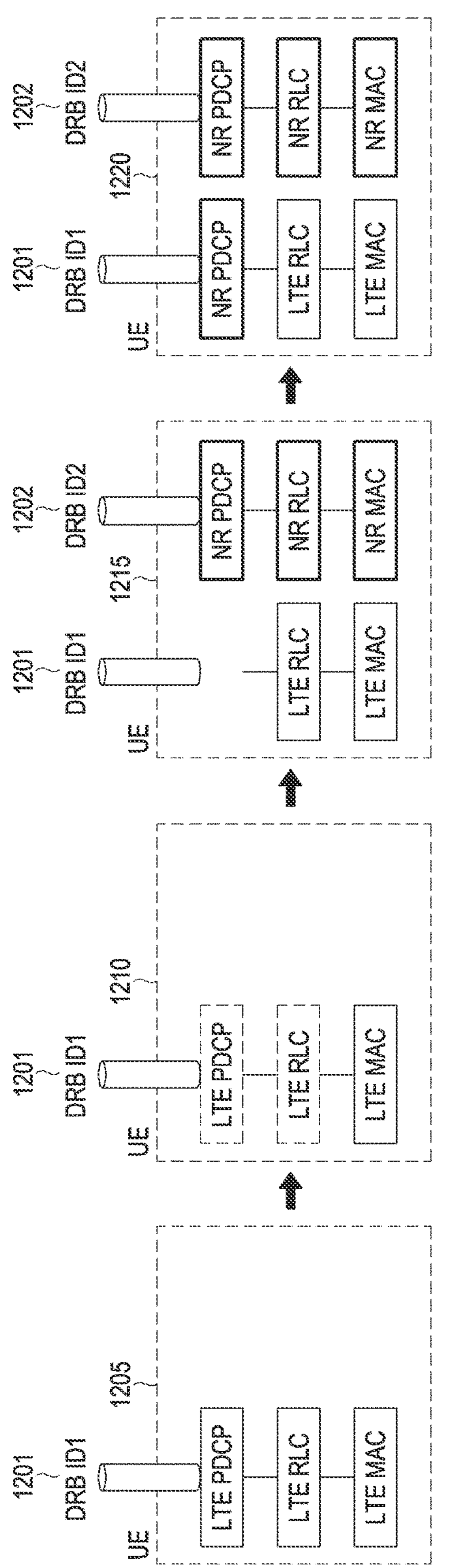
FIG. 12 is a view illustrating methods for changing the version of a PDCP layer device without loss according to an embodiment of the disclosure.

FIG. 12 is a view illustrating methods for changing the version of a PDCP layer device without loss according to an embodiment of the disclosure. The method for changing the version of the PDCP layer device without loss may be applied when changing an LTE PDCP layer device into an NR PDCP layer device or when changing an NR PDCP layer device into an LTE PDCP layer device;

In FIG. 12, the UE may receive the RRC message from the LTE base station or the NR base station. If the RRC message indicates a version change of the PDCP layer device for a certain bearer, e.g., if the RRC message including a configuration for releasing the LTE PDCP device corresponding to the first bearer identifier 1201 does not include NR PDCP configuration information corresponding to the first bearer identifier, and the NR PDCP for the first bearer identifier has already been configured (when the LTE PDCP layer device of a certain bearer is changed to the NR PDCP layer device) or the RRC message including a configuration for releasing the NR PDCP device for the first bearer identifier where the NR PDCP device and LTE RLC device have been configured includes LTE PDCP configuration information corresponding to the first bearer identifier (when changing the NR PDCP layer device of a certain bearer to the LTE PDCP layer device), the following procedure may be performed.

As described above, if the UE receives RRC messages from the LTE base station or NR base station and is instructed to change the version of the PDCP layer device of a certain bearer, the first embodiment proposed below in the disclosure may be performed.

1. If the UE is instructed to change the version of the PDCP layer device for the first bearer through the RRC message (1205)

A. identifies the bearer identifier and transfers and stores the data (e.g., PDCP SDU and/or PDCP PDU) stored in the current PDCP layer device (e.g., LTE PDCP layer device or NR PDCP layer device) corresponding to the bearer identifier in ascending order of PDCP serial number or in ascending order of COUNT value or in order of reception from the higher layer to the newly changed PDCP layer device (e.g., NR PDCP layer device or LTE PDCP layer device) so that the data is processed like new data.

B. after transferring the data stored in the current PDCP layer device (e.g., LTE PDCP layer device or NR PDCP layer device) to the newly configured or changed PDCP layer device, releases the configuration for the current PDCP layer device (e.g., releases stored status variable values or timer value or COUNT value or ROHC configuration) and releases the PDCP layer device for the bearer identifier (1210).

C. further identifies the bearer identifier and discards all data (e.g., RLC SDU and/or RLC PDU) stored in the current RLC layer device (e.g., LTE RLC layer device) corresponding to the bearer identifier (1210).

D. applies the configuration of the new PDCP layer device (e.g., NR PDCP layer device or LTE PDCP layer device) indicated with the new configuration and included in the RRC message to establish a new PDCP layer device (e.g., NR PDCP layer device or LTE PDCP layer device) for the bearer identifier and processes the data (e.g., PDCP SDU) received from the PDCP layer device (e.g., LTE PDCP layer device or NR PDCP layer device) which was configured before but now released) (performs ciphering and integrity protection with a new ciphering key) and prepares to transmit it (1215).

E. after discarding the data stored in the current RLC layer device (e.g., LTE RLC layer device), releases the configuration for the current RLC layer device (e.g., releases stored status variable values or timer value) and releases the PDCP layer device for the bearer identifier. newly establishes the RLC layer device for the bearer identifier according to the configuration of the RLC layer device included in the RRC message (1215).

F. further releases the current data traffic channel identifier (DTCH) corresponding to the bearer identifier in the MAC layer device corresponding to the bearer identifier and may newly configure the new data traffic channel identifier included in the RRC message in the MAC layer device (1215).

G. connects the PDCP layer device (e.g., NR PDCP layer device or LTE PDCP layer device) newly configured for the bearer identifier to the RLC layer device (e.g., LTE RLC layer device) or MAC layer device and may complete the PDCP layer device version change procedure (1220). Then, the newly configured PDCP layer device starts transmission.

Further, as described above, if the UE receives RRC messages from the LTE base station or NR base station and is instructed to change the version of the PDCP layer device of a certain bearer, the second embodiment proposed below in the disclosure may be performed.

1. If the UE is instructed to change the version of the PDCP layer device for the first bearer through the RRC message (1205)

A. identifies the bearer identifier and transfers and stores all data that have values larger than or equal to the PDCP serial number or COUNT value of the first data for which successful transfer is not acknowledged (RLC NACK) from the RLC layer devices (RLC status PDUs) connected with the current (pre-change) PDCP layer device among the data (e.g., PDCP SDU and/or PDCP PDU) stored in the current PDCP layer device (e.g., LTE PDCP layer device or NR PDCP layer device) to the newly changed PDCP layer device (e.g., NR PDCP layer device or LTE PDCP layer device) in ascending order or all data received from the higher layer device later than the first data, in order, to the newly changed PDCP layer device (e.g., NR PDCP layer device or LTE PDCP layer device) to be processed like new data.

B. after transferring the data stored in the current PDCP layer device (e.g., LTE PDCP layer device or NR PDCP layer device) to the newly configured or changed PDCP layer device, releases the configuration for the current PDCP layer device (e.g., releases stored status variable values or timer value or COUNT value or ROHC configuration) and releases the PDCP layer device for the bearer identifier (1210).

C. further identifies the bearer identifier and discards all data (e.g., RLC SDU and/or RLC PDU) stored in the current RLC layer device (e.g., LTE RLC layer device) corresponding to the bearer identifier (1210).

D. applies the configuration of the new PDCP layer device (e.g., NR PDCP layer device or LTE PDCP layer device) indicated with the new configuration and included in the RRC message to establish a new PDCP layer device (e.g., NR PDCP layer device or LTE PDCP layer device) for the bearer identifier and processes the data (e.g., PDCP SDU) received from the PDCP layer device (e.g., LTE PDCP layer device or NR PDCP layer device) which was configured before but now released) (performs ciphering and integrity protection with a new ciphering key) and prepares to transmit it (1215).

E. after discarding the data stored in the current RLC layer device (e.g., LTE RLC layer device), releases the configuration for the current RLC layer device (e.g., releases stored status variable values or timer value) and releases the PDCP layer device for the bearer identifier. newly establishes the RLC layer device for the bearer identifier according to the configuration of the RLC layer device included in the RRC message (1215).

F. further releases the current data traffic channel identifier (DTCH) corresponding to the bearer identifier in the MAC layer device corresponding to the bearer identifier and may newly configure the new data traffic channel identifier included in the RRC message in the MAC layer device (1215).

G. connects the PDCP layer device (e.g., NR PDCP layer device or LTE PDCP layer device) newly configured for the bearer identifier to the RLC layer device (e.g., LTE RLC layer device) or MAC layer device and may complete the PDCP layer device version change procedure (1220). Then, the newly configured PDCP layer device starts transmission.

Further, as described above, if the UE receives RRC messages from the LTE base station or NR base station and is instructed to change the version of the PDCP layer device of a certain bearer, the third embodiment proposed below in the disclosure may be performed.

1. If the UE is instructed to change the version of the PDCP layer device for the first bearer through the RRC message (1205)

A. identifies the bearer identifier and transfers and stores only data for which successful transfer is not acknowledged (RLC NACK) from the radio link control (RLC) layer devices (RLC status PDUs) connected with the pre-change PDCP layer device among the data (e.g., PDCP SDU or PDCP PDU) stored in the current PDCP layer device (e.g., LTE PDCP layer device or NR PDCP layer device) to the newly changed PDCP layer device (e.g., NR PDCP layer device or LTE PDCP layer device) in ascending order of PDCP serial number or COUNT value or in order of reception from the higher layer device to be processed like new data.

B. after transferring the data stored in the current PDCP layer device (e.g., LTE PDCP layer device or NR PDCP layer device) to the newly configured or changed PDCP layer device, releases the configuration for the current PDCP layer device (e.g., releases stored status variable values or timer value or COUNT value or ROHC configuration) and releases the PDCP layer device for the bearer identifier (1210).

C. further identifies the bearer identifier and discards all data (e.g., RLC SDU or RLC PDU) stored in the current RLC layer device (e.g., LTE RLC layer device) corresponding to the bearer identifier (1210).

D. applies the configuration of the new PDCP layer device (e.g., NR PDCP layer device or LTE PDCP layer device) indicated with the new configuration and included in the RRC message to establish a new PDCP layer device (e.g., NR PDCP layer device or LTE PDCP layer device) for the bearer identifier and processes the data (e.g., PDCP SDU) received from the PDCP layer device (e.g., LTE PDCP layer device or NR PDCP layer device) which was configured before but now released) (performs ciphering and integrity protection with a new ciphering key) and prepares to transmit it (1215).

E. after discarding the data stored in the current RLC layer device (e.g., LTE RLC layer device), releases the configuration for the current RLC layer device (e.g., releases stored status variable values or timer value) and releases the PDCP layer device for the bearer identifier. newly establishes the RLC layer device for the bearer identifier according to the configuration of the RLC layer device included in the RRC message (1215).

F. further releases the current data traffic channel identifier (DTCH) corresponding to the bearer identifier in the MAC layer device corresponding to the bearer identifier and may newly configure the new data traffic channel identifier included in the RRC message in the MAC layer device (1215).

G. connects the PDCP layer device (e.g., NR PDCP layer device or LTE PDCP layer device) newly configured for the bearer identifier to the RLC layer device (e.g., LTE RLC layer device) or MAC layer device and may complete the PDCP layer device version change procedure (1220). Then, the newly configured PDCP layer device starts transmission.

In the foregoing in the disclosure, the UE receives the RRC message and, if a version change of the PDCP layer device is instructed, releases the current version of PDCP layer device corresponding to the first bearer to prevent data loss for uplink data of the first bearer and, before discarding the data, transfers the data (e.g., PDCP SDU) stored in the current version of PDCP layer device to the newly configured version of PDCP layer device so that the data is regarded as data received from the higher layer device by the new version of PDCP layer device, and data processing (e.g., newly configuring the PDCP header for the received PDCP SDUs to fit the configuration of the new PDCP layer device and performing integrity protection or ciphering with a new security key to configure the PDCP PDU) is performed again and transmitted.

The lossless PDCP layer device version change method proposed above in the disclosure may be applied likewise to base stations for downlink data. For example, when the base station instructs the UE to change the PDCP layer device version through the RRC message, the base station having the current version of PDCP layer device corresponding to the first bearer may release the PDCP layer device to prevent data loss for downlink data of the first bearer and, before discarding the data, transfer the data (e.g., PDCP SDU) stored in the current version of PDCP layer device to the base station having the newly configured version of PDCP layer device so that the data is regarded as data received from the higher layer device by the new version of PDCP layer device, and again perform data processing (e.g., newly configuring the PDCP header for the received PDCP SDUs to fit the configuration of the new PDCP layer device and performing integrity protection or ciphering with a new security key to configure the PDCP PDU) and transmit the same. The first embodiment, second embodiment, or third embodiment of the lossless PDCP layer device version change method proposed in the disclosure may be likewise applied to the LTE base station or NR base station that sends downlink data.

Proposed below is a second embodiment of enhancing security of data transmitted or received between a UE and a network using an integrity protection or verification procedure of the disclosure. The second embodiment may be performed when the NR base station or LTE base station connected to the LTE system (EPC) or NR system allows the UE to configure and use an integrity protection or verification function.

In the disclosure, when the base station configures the integrity protection or verification function for the DRB (or user plane data) to the UE connected to the 5GC or LTE base station or NR base station, the NR system (5GC) or LTE base station or NR base station may instruct the UE that supports the integrity protection or verification function as UE capability (or reported to support as UE capability) to configure or perform the second embodiment.

In the disclosure, when the base station configures the integrity protection or verification function for the DRB (or user plane data) to the UE connected to the EPC or LTE base station or NR base station (or UE connected to the NR system (5GC) or LTE base station), the LTE system (EPC) or LTE base station or NR base station may instruct the UE that supports the integrity protection or verification function for the DRB (or user plane data) as UE capability (or reported to support as UE capability) to configure or perform the second embodiment.

The second embodiment specifically proposes each method for supporting an integrity protection or verification function in a transmission or reception procedure of the PDCP layer device of split DRB or LTE/WLAN aggregation (LWA) or AM DRB (e.g., PDCP layer device using reordering function) or a transmission or reception procedure of the PDCP layer device for UM DRB or a transmission or reception procedure of the list decoding for AM DRB (e.g., PDCP layer device not using reordering function) so that the LTE PDCP layer device may support integrity protection (or verification) function when enhancing security using an integrity protection or verification procedure.

The second embodiment proposes introduction of an integrity protection (or verification) indicator (integrityProtection) in the LTE PDCP layer device configuration information (pdcp-config or pdcp-config that may be included (or configured) in RadioResourceConfigDedicated). In the foregoing, the indicator (integrity protection) indicating the integrity protection or verification procedure may indicate activated or inactivated or enabled or not enabled for the integrity protection or verification procedure and, when the indicator is included, it may indicate to activate or enable the integrity protection or verification function and, when the indicator is not included, it may indicate to inactivate or disable the integrity protection or verification function.

The second embodiment proposes different PDCP layer device reception operations depending on whether the PDCP layer device is the NR PDCP layer device or LTE PDCP layer device, the type of the bearer (SRB or DRB or LWA DRB or split DRB) or the type of the RLC mode connected to the PDCP (RLC UM or AM), or whether the reordering timer (t-reordering) is used and proposes different integrity protection or verification procedures in the proposed PDCP layer device reception operations.

In the disclosure, if integrity verification fails for the data received for the SRB (PDCP data PDU), it may be indicated to the higher layer device (e.g., RRC layer device), and a radio link failure (RLF) is declared, and an RRC connection reestablishment procedure is performed. However, for DRB, although the integrity verification fails for the received data (PDCP data PDU), it may be indicated to the higher layer device (e.g., RRC layer device), but unlike the SRB, no RRC connection reestablishment procedure is performed. As another method, to reduce unnecessary indication or processing, for DRB, although integrity verification failure occurs for the received data (PDCP data PDU), it may not be indicated to the higher layer device (e.g., RRC layer device).

Because of the integrity verification procedure for the DRB described above or the operation of the PDCP layer device when the integrity verification fails, the hacker may attempt an attack that causes data loss by exploiting the integrity protection or verification procedure and the duplicate detection procedure. For example, a hacker may transmit a large amount of data having different COUNT values (or PDCP sequence numbers (PDCP SNs)) to the reception PDCP layer device of the UE. If the integrity protection or verification procedure is configured, the reception PDCP layer device may identify the integrity verification failure on the data transmitted by the hacker and discard the data corresponding to the attack. However, an issue is that the reception PDCP layer device may regard that the COUNT value corresponding to the data by the attach has been received. Accordingly, although normal data transmitted by the transmit end, not the attacked data, is received, if the COUNT value (or PDCP serial number) corresponding to the normal data is the same as the COUNT value (or PDCP serial number) of the attacked data, the reception PDCP layer device regards it as duplicate reception of the normal data and discards the same. Resultantly, the reception PDCP layer device discards normal data through the duplicate detection procedure, due to the hacker's attach, causing data loss.

Specifically, if in the duplicate detection procedure, the COUNT value (or PDCP serial number) corresponding to the currently received data has been received before, and the data corresponding to the COUNT value (or PDCP serial number) has successfully been received before (in a case where the integrity protection or verification procedure is configured, if the data corresponding to the COUNT value (or PDCP serial number) has been received before, and the integrity verification procedure has been successfully performed), the reception PDCP layer device may determine that duplicate detection has occurred and discard the received data to enhance the duplicate detection procedure and prevent attacks from hackers. Further, the reception PDCP layer device may regard the data, which is discarded due to integrity verification failure, as data that has not been received or was not received and may regard the COUNT value (or PDCP serial number) of the data discarded due to the integrity verification failure as having not been received not to be updated in the window variables. Therefore, although receiving data having the same COUNT value (or PDCP serial number) as the COUNT value (or PDCP serial number) as the data discarded due to integrity verification failure in the future, if the integrity verification procedure succeeds, it may be avoided from being discarded by the duplicate detection procedure. Further, when the integrity protection or verification procedure is not configured, it may be immediately discarded if the COUNT value corresponding to the currently received data has been received before. Successfully receiving data in the foregoing may indicate that the data corresponding to the COUNT value has been processed and stored in buffer or has been received, processed, and transferred to the higher layer device, or data has been transferred to the higher layer device and then discarded or, when the integrity protection or verification procedure is configured, the integrity verification has successfully been performed on the data corresponding to the COUNT value. In other words, since integrity verification failure on the received data may be determined to be failure in data reception by the hacker's attack, normal data may be avoided from being discarded in the duplicate detection procedure.

Thus, to defend the hacker's attack or support the integrity protection or verification function in the PDCP layer device, the second embodiment proposes different PDCP layer device reception operations depending on whether the PDCP layer device is the NR PDCP layer device or LTE PDCP layer device, the type of the bearer (SRB or DRB or LWA DRB or split DRB) or the type of the RLC mode connected to the PDCP (RLC UM or AM), or whether the reordering timer (t-reordering) is used and proposes different integrity protection or verification procedures in the proposed PDCP layer device reception operations.

In the second embodiment of the disclosure, the following 2-1th embodiment is proposed that performs an integrity protection or verification function procedure for data received based on a window of a PUSH window method that is driven by window variables when the LTE PDCP layer device is connected with the RLC AM mode and does not use the reordering timer (or reordering function). In the procedure proposed below, the UE may operate considering the order, in order from top to bottom.

Procedures for DRBs Mapped on RLC AM when the Reordering Function is not Used

For DRBs mapped on RLC AM, when the reordering function is not used, at reception of a PDCP Data PDU from lower layers, the UE shall:

1> if received PDCP SN−Last_Submitted_PDCP_RX_SN>Reordering_Window or 0<=Last_Submitted_PDCP_RX_SN-received PDCP SN< Reordering_Window:

2> if received PDCP SN>Next_PDCP_RX_SN:

3> decipher the PDCP PDU as specified in the clause 5.6, and perform integrity verification of the PDCP Data PDU (if applicable) using COUNT based on RX_HFN−1 and the received PDCP SN;

2> else:

3> decipher the PDCP PDU as specified in the clause 5.6, and perform integrity verification of the PDCP Data PDU (if applicable) using COUNT based on RX_HFN and the received PDCP SN;

2> if integrity verification fails:

3> indicate the integrity verification failure to upper layer. UE can skip or does not perform this indication procedure to avoid unnecessary signaling between RRC entity and PDCP entity, and its corresponding unnecessary processing.

3> discard the PDCP PDU or consider it as not received to avoid header decompression or to avoid security threat since UE doesn't have to perform header compression for unauthentic PDCP Data PDU (or SDU); The UE should discard the PDCP Data PDU without/before performing header decompression and/or without delivering any stored PDCP SDU(s) to upper layers. The UE should set the RX_HFN, Next_PDCP_RX_SN and Last_Submitted_PDCP_RX_SN to the respective values they had before the reception of the PDCP Data PDU.

3> In the above procedure, UE can first discard the PDCP PDU and perform state variable setting. After that UE can indicate the integrity verification failure to upper layer to avoid the data processing delay, which comes from late discarding and indication to upper layer.

2> perform header decompression (if configured) using ROHC as specified in the clause 5.5.5 and/or using EHC as specified in the clause 5.14.5;

2> discard this PDCP SDU;

1> else if Next_PDCP_RX_SN−received PDCP SN> Reordering_Window:

2> increment RX_HFN by one;

2> use COUNT based on RX_HFN and the received PDCP SN for deciphering the PDCP PDU and integrity verification of the PDCP PDU;

2> set Next_PDCP_RX_SN to the received PDCP SN+1;

1> else if received PDCP SN-Next_PDCP_RX_SN>=Reordering_Window:

2> use COUNT based on RX_HFN−1 and the received PDCP SN for deciphering the PDCP PDU and integrity verification of the PDCP PDU;

1> else if received PDCP SN>=Next_PDCP_RX_SN:

2> use COUNT based on RX_HFN and the received PDCP SN for deciphering the PDCP PDU and integrity verification of the PDCP PDU;

2> set Next_PDCP_RX_SN to the received PDCP SN+1;

2> if Next_PDCP_RX_SN is larger than Maximum_PDCP_SN:

3> set Next_PDCP_RX_SN to 0;

3> increment RX_HFN by one;

1> else if received PDCP SN<Next_PDCP_RX_SN:

2> use COUNT based on RX_HFN and the received PDCP SN for deciphering the PDCP PDU and integrity verification of the PDCP PDU;

1> if the PDCP PDU has not been discarded in the above:

2> perform deciphering (if configured) for the PDCP PDU as specified in the clauses 5.6 and integrity verification (if applicable) of the PDCP PDU;

2> if integrity verification fails:

3> indicate the integrity verification failure to upper layer. UE can skip or does not perform this indication procedure to avoid unnecessary signaling between RRC entity and PDCP entity, and its corresponding unnecessary processing.

3> discard the PDCP PDU or consider it as not received to avoid header decompression or to avoid security threat since UE doesn't have to perform header compression for unauthentic PDCP Data PDU (or SDU); The UE should discard the PDCP Data PDU without/before performing header decompression and/or without delivering any stored PDCP SDU(s) to upper layers. The UE should set the RX_HFN, Next_PDCP_RX_SN and Last_Submitted_PDCP_RX_SN to the respective values they had before the reception of the PDCP Data PDU.

3> In the above procedure, UE can first discard the PDCP PDU and perform state variable setting. After that UE can indicate the integrity verification failure to upper layer to avoid the data processing delay, which comes from late discarding and indication to upper layer.

2> perform header decompression (if configured) for the PDCP PDU using ROHC as specified in the clause 5.5.5 and/or using EHC as specified in the clause 5.14.5;

2> if a PDCP SDU with the same PDCP SN is stored:

3> discard this PDCP SDU;

2> else:

3> store the PDCP SDU;

2> if the PDCP PDU received by PDCP is not due to the re-establishment of lower layers:

3> deliver to upper layers in ascending order of the associated COUNT value:

4> all stored PDCP SDU(s) with an associated COUNT value less than the COUNT value associated with the received PDCP SDU;

4> all stored PDCP SDU(s) with consecutively associated COUNT value(s) starting from the COUNT value associated with the received PDCP SDU;

3> set Last_Submitted_PDCP_RX_SN to the PDCP SN of the last PDCP SDU delivered to upper layers;

2> else if received PDCP SN=Last_Submitted_PDCP_RX_SN+1 or received PDCP SN=Last_Submitted_PDCP_RX_SN−Maximum_PDCP_SN:

3> deliver to upper layers in ascending order of the associated COUNT value:

4> all stored PDCP SDU(s) with consecutively associated COUNT value(s) starting from the COUNT value associated with the received PDCP SDU;

4> set Last_Submitted_PDCP_RX_SN to the PDCP SN of the last PDCP SDU delivered to upper layers In the second embodiment of the disclosure, the following 2-2th embodiment is proposed that performs an integrity protection or verification function procedure for data received based on a window of a PULL window method that is driven by window variables when the LTE PDCP layer device is connected with the RLC UM mode and does not use the reordering timer (or reordering function). In the procedure proposed below, the UE may operate considering the order, in order from top to bottom.

Procedures for DRBs Mapped on RLC UM when the Reordering Function is not Used

For DRBs mapped on RLC UM, at reception of a PDCP Data PDU from lower layers, the UE shall:

1> if received PDCP SN<Next_PDCP_RX_SN:

2> decipher and verify the integrity of the PDU (if applicable) using COUNT based on RX_HFN+1 and the received PDCP SN as specified in the clauses 5.6 and 5.7, respectively;

1> else:

2> decipher and verify the integrity of the PDU (if applicable) using COUNT based on RX_HFN and the received PDCP SN as specified in the clauses 5.6 and 5.7, respectively;

1> if integrity verification is applicable and the integrity verification is passed successfully; or 1> if integrity verification is not applicable:

2> if received PDCP SN<Next_PDCP_RX_SN:

3> increment RX_HFN by one;

3> set Next_PDCP_RX_SN to the received PDCP SN+1;

2> if Next_PDCP_RX_SN>Maximum_PDCP_SN:
3> set Next_PDCP_RX_SN to 0;
3> increment RX_HFN by one;
1> else, if integrity verification is applicable and the integrity verification fails:
2> indicate the integrity verification failure to upper layer.
2> discard the received PDCP Data PDU or consider it as not received to avoid header decompression or to avoid security threat since UE doesn't have to perform header compression for unauthentic PDCP Data PDU (or SDU); The UE should discard the PDCP Data PDU without/before performing header decompression and/or without delivering any stored PDCP SDU(s) to upper layers. The UE should set the RX_HFN and Next_PDCP_RX_SN to the respective values they had before the reception of the PDCP Data PDU.
2> In the above procedure, UE can first discard the PDCP PDU and perform state variable setting. After that UE can indicate the integrity verification failure to upper layer to avoid the data processing delay, which comes from late discarding and indication to upper layer.
1> perform header decompression (if configured) of the deciphered PDCP Data PDU using ROHC as specified in the clause 5.5.5 and/or using EHC as specified in the clause 5.14.5;
1> deliver the resulting PDCP SDU to upper layer.

In the second embodiment of the disclosure, the following 2-3th embodiment is proposed that performs an integrity protection or verification function procedure for data received based on a window of a PUSCH window method that is driven by window variables when the LTE PDCP layer device is connected with the RLC AM mode or RLC UM mode and uses the reordering timer (or reordering function) or in the case of the LWA bearer. In the procedure proposed below, the UE may operate considering the order, in order from top to bottom.

Procedures for DRBs Mapped on RLC AM or RLC UM, for LWA Bearers and SLRB when the Reordering Function is Used For DRBs mapped on RLC AM or RLC UM, SLRB and for LWA bearers, or for DRBs and SRBs when PDCP duplication is used, when the reordering function is used, at reception of a PDCP Data PDU from lower layers, the UE shall:

1> if received PDCP SN−Last_Submitted_PDCP_RX_SN>Reordering_Window or 0<=Last_Submitted_PDCP_ RX_SN−received PDCP SN< Reordering_Window:
2> if the PDCP PDU was received on WLAN:
3> if received PDCP SN>Next_PDCP_RX_SN:
4> for the purpose of setting the HRW field in the LWA status report, use COUNT based on RX_HFN−1 and the received PDCP SN;
3> else:
4> for the purpose of setting the HRW field in the LWA status report, use COUNT based on RX_HFN and the received PDCP SN;
2> if received PDCP SN>Next_PDCP_RX_SN:
3> decipher the PDCP PDU as specified in the clause 5.6, and perform integrity verification of the PDCP Data PDU (if applicable) using COUNT based on RX_HFN−1 and the received PDCP SN.
2> else:
3> decipher the PDCP PDU as specified in the clause 5.6, and perform integrity verification of the PDCP Data PDU (if applicable) using COUNT based on RX_HFN and the received PDCP SN.
2> if integrity verification fails:
3> indicate the integrity verification failure to upper layer.
2> discard the PDCP PDU;
1> else if Next_PDCP_RX_SN−received PDCP SN>Reordering_Window:
2> increment RX_HFN by one;
2> use COUNT based on RX_HFN and the received PDCP SN for deciphering and integrity verification (if applicable) of the PDCP PDU;
2> set Next_PDCP_RX_SN to the received PDCP SN+1;
1> else if received PDCP SN-Next_PDCP_RX_SN>=Reordering_Window:
2> use COUNT based on RX_HFN−1 and the received PDCP SN for deciphering and integrity verification (if applicable) of the PDCP PDU.
1> else if received PDCP SN>=Next_PDCP_RX_SN:
2> use COUNT based on RX_HFN and the received PDCP SN for deciphering and integrity verification (if applicable) of the PDCP PDU;
2> set Next_PDCP_RX_SN to the received PDCP SN+1;
2> if Next_PDCP_RX_SN is larger than Maximum_PDCP_SN:
3> set Next_PDCP_RX_SN to 0;
3> increment RX_HFN by one.
1> else if received PDCP SN<Next_PDCP_RX_SN:
2> use COUNT based on RX_HFN and the received PDCP SN for deciphering and integrity verification of the PDCP PDU;
1> if the PDCP PDU has not been discarded in the above:
2> if a PDCP SDU with the same PDCP SN is stored:
3> perform deciphering and integrity verification (if applicable) of the PDCP PDU;
3> if integrity verification fails:
4> indicate the integrity verification failure to upper layer. UE can skip or does not perform this indication procedure to avoid unnecessary signaling between RRC entity and PDCP entity, and its corresponding unnecessary processing.
3> discard the PDCP PDU;
2> else:
3> perform deciphering and integrity verification (if applicable) of the PDCP PDU and store the resulting PDCP SDU;
3> if integrity verification fails:
4> indicate the integrity verification failure to upper layer; UE can skip or does not perform this indication procedure to avoid unnecessary signaling between RRC entity and PDCP entity, and its corresponding unnecessary processing.
4> discard the PDCP PDU or consider it as not received to avoid header decompression or to avoid security threat since UE doesn't have to perform header compression for unauthentic PDCP Data PDU (or SDU); The UE should discard the PDCP Data PDU without/before performing header decompression and/or without delivering any stored PDCP SDU(s) to upper layers. The UE should set the RX_HFN, Next_PDCP_RX_SN and Last_Submitted_PDCP_RX_SN to the respective values they had before the reception of the PDCP Data PDU.
4> In the above procedure, UE can first discard the PDCP PDU and perform state variable setting. After that UE can indicate the integrity verification failure to upper layer to avoid the data processing delay, which comes from late discarding and indication to upper layer.

1> if the PDCP PDU has not been discarded in the above:

2> if received PDCP SN=Last_Submitted_PDCP_RX_SN+1 or received PDCP SN=Last_Submitted_PDCP_RX_SN−Maximum_PDCP_SN:

3> deliver to upper layers in ascending order of the associated COUNT value after performing header decompression (if configured) using ROHC as specified in the clause 5.5.5 and/or using EHC as specified in the clause 5.14.5:

4> all stored PDCP SDU(s) with consecutively associated COUNT value(s) starting from the COUNT value associated with the received PDCP PDU;

3> set Last_Submitted_PDCP_RX_SN to the PDCP SN of the last PDCP SDU delivered to upper layers;

2> if t-Reordering is running:

3> if the PDCP SDU with Reordering_PDCP_RX_COUNT−1 has been delivered to upper layers:

4> stop and reset t-Reordering;

2> if t-Reordering is not running (includes the case when t-Reordering is stopped due to actions above):

3> if there is at least one stored PDCP SDU:

4> start t-Reordering;

4> set Reordering_PDCP_RX_COUNT to the COUNT value associated to RX_HFN and Next_PDCP_RX_SN.

COUNT

Length: 32 bits

For ciphering and integrity a COUNT value is maintained. The COUNT value is composed of a HFN and the PDCP SN. The length of the PDCP SN is configured by upper layers.

Format of COUNT

The size of the HFN part in bits is equal to 32 minus the length of the PDCP SN.

MAC-I

Length: 32 bits

The MAC-I field carries a message authentication code calculated

For control plane data (SRB's data) that are not integrity protected, the MAC-I field is still present and should be padded with padding bits set to 0.

For user plane data (DRB's data) that are integrity protected, the MAC-I field is present. For user plane data that are not integrity protected, the MAC-I field is not present (absent).

State Variables

This sub clause describes the state variables used in PDCP entities in order to specify the PDCP protocol.

All state variables are non-negative integers.

The transmitting side of each PDCP entity shall maintain the following state variables:

a) Next_PDCP_TX_SN

The variable Next_PDCP_TX_SN indicates the PDCP SN of the next PDCP SDU for a given PDCP entity. At establishment of the PDCP entity, the UE shall set Next_PDCP_TX_SN to 0. For the PDCP entity mapped with SLRB of which the indicated SL-V2X-TxProfile is rel15, the UE shall set Next_PDCP_TX_SN to 1 at establishment of the PDCP entity.

b) TX_HFN

The variable TX_HFN indicates the HFN value for the generation of the COUNT value used for PDCP PDUs for a given PDCP entity. At establishment of the PDCP entity, the UE shall set TX_HFN to 0.

The receiving side of each PDCP entity shall maintain the following state variables:

c) Next_PDCP_RX_SN

The variable Next_PDCP_RX_SN indicates the next expected PDCP SN by the receiver for a given PDCP entity. At establishment of the PDCP entity, the UE shall set Next_PDCP_RX_SN to 0. For the PDCP entity mapped with SLRB of which the indicated SL-V2X-TxProfile is rel15, the UE shall set Next_PDCP_RX_SN to (x+1) modulo (Maximum_PDCP_SN+1), where x is the SN of the first received PDCP Data PDU with SN not set to "0".

d) RX_HFN

The variable RX_HFN indicates the HFN value for the generation of the COUNT value used for the received PDCP PDUs for a given PDCP entity. At establishment of the PDCP entity, the UE shall set RX_HFN to 0.

e) Last_Submitted_PDCP_RX_SN

The variable Last_Submitted_PDCP_RX_SN indicates the SN of the last PDCP SDU delivered to the upper layers. At establishment of the PDCP entity, the UE shall set Last_Submitted_PDCP_RX_SN to Maximum_PDCP_SN. For the PDCP entity mapped with SLRB of which the indicated SL-V2X-TxProfile is rel15, the UE shall set Last_Submitted_PDCP_RX_SN to (x−0.5*Reordering_Window) modulo (Maximum_PDCP_SN+1), where x is the SN of the first received PDCP Data PDU with SN not set to "0". When upper layers reconfigure the PDCP entity to configure DAPS for a DRB mapped on RLC UM, the UE shall set Last_Submitted_PDCP_RX_SN to (Next_PDCP_RX_SN−1) modulo (Maximum_PDCP_SN+1).

f) Reordering_PDCP_RX_COUNT

This variable is used only when the reordering function is used. This variable holds the value of the COUNT following the COUNT value associated with the PDCP PDU which triggered t-Reordering. When upper layers reconfigure the PDCP entity to configure DAPS, the UE shall set Reordering_PDCP_RX_COUNT to the COUNT value associated to RX_HFN and Next_PDCP_RX_SN.

In the second embodiment of the disclosure, the following 2-4th embodiment is proposed that performs an integrity protection or verification function procedure for data received based on a window of a PUSCH window method that is driven by window variables in the NR PDCP layer device. In the procedure proposed below, the UE may operate considering the order, in order from top to bottom.

Actions when a PDCP Data PDU is Received from Lower Layers

In this clause, following definitions are used:

HFN(State Variable): the HFN part (i.e., the number of most significant bits equal to HFN length) of the State Variable;

SN(State Variable): the SN part (i.e., the number of least significant bits equal to PDCP SN length) of the State Variable;

RCVD_SN: the PDCP SN of the received PDCP Data PDU, included in the PDU header;

RCVD_HFN: the HFN of the received PDCP Data PDU, calculated by the receiving PDCP entity;

RCVD_COUNT: the COUNT of the received PDCP Data PDU=[RCVD_HFN, RCVD_SN].

At reception of a PDCP Data PDU from lower layers, the receiving PDCP entity shall determine the COUNT value of the received PDCP Data PDU, i.e., RCVD_COUNT, as follows:

1> if RCVD_SN<SN(RX_DELIV)−Window_Size:

2> RCVD_HFN=HFN(RX_DELIV)+1.

1> else if RCVD_SN>=SN(RX_DELIV)+Window_Size:

2> RCVD_HFN=HFN(RX_DELIV)−1.

1> else:

2> RCVD_HFN=HFN(RX_DELIV);

1> RCVD_COUNT=[RCVD_HFN, RCVD_SN].

After determining the COUNT value of the received PDCP Data PDU=RCVD_COUNT, the receiving PDCP entity shall:

1> perform deciphering and integrity verification of the PDCP Data PDU using COUNT=RCVD_COUNT;

2> if integrity verification fails:

3> indicate the integrity verification failure to upper layer;

3> discard the PDCP Data PDU and consider it as not received;

1> if RCVD_COUNT<RX_DELIV; or

1> if the PDCP Data PDU with COUNT=RCVD_COUNT has been received before:

2> discard the PDCP Data PDU;

If the received PDCP Data PDU with COUNT value=RCVD_COUNT is not discarded above, the receiving PDCP entity shall:

1> store the resulting PDCP SDU in the reception buffer;

1> if RCVD_COUNT>=RX_NEXT:

2> update RX_NEXT to RCVD_COUNT+1.

1> if outOfOrderDelivery is configured:

2> deliver the resulting PDCP SDU to upper layers after performing header decompression using EHC.

1> if RCVD_COUNT=RX_DELIV:

2> deliver to upper layers in ascending order of the associated COUNT value after performing header decompression, if not decompressed before;

3> all stored PDCP SDU(s) with consecutively associated COUNT value(s) starting from COUNT=RX_DELIV;

2> update RX_DELIV to the COUNT value of the first PDCP SDU which has not been delivered to upper layers, with COUNT value>RX_DELIV;

1> if t-Reordering is running, and if RX_DELIV>=RX_REORD:

2> stop and reset t-Reordering.

1> if t-Reordering is not running (includes the case when t-Reordering is stopped due to actions above), and RX_DELIV<RX_NEXT:

2> update RX_REORD to RX_NEXT;

2> start t-Reordering.

State Variables

This sub clause describes the state variables used in PDCP entities in order to specify the PDCP protocol. The state variables defined in this clause are normative.

All state variables are non-negative integers, and take values from 0 to $[2^{=}-1]$.

PDCP Data PDUs are numbered integer sequence numbers (SN) cycling through the field: 0 to $[2^{[pdcp\text{-}SN\text{-}SizeUL]}-1]$ or 0 to $[2^{[pdcp\text{-}SN\text{-}SizeDL]}-1]$ or 0 to $[2^{[s\text{-}PDCP\text{-}SN\text{-}Size]}-1]$.

The transmitting PDCP entity shall maintain the following state variables:

a) TX NEXT

This state variable indicates the COUNT value of the next PDCP SDU to be transmitted. The initial value is 0, except for SRBs configured with state variables continuation. For target SRB configured with state variables continuation, the initial value is the value stored in PDCP entity for the corresponding source SRB. For source SRB configured with state variables continuation, the initial value is the value stored in PDCP entity for the corresponding target SRB.

The receiving PDCP entity shall maintain the following state variables:

a) RX_NEXT

This state variable indicates the COUNT value of the next PDCP SDU expected to be received. The initial value is 0, except for sidelink broadcast and groupcast, and for SRBs configured with state variables continuation. For NR sidelink communication for broadcast and groupcast, the initial value of the SN part of RX_NEXT is (x+1) modulo $(2^{[sl\text{-}PDCP\text{-}SN\text{-}Size]})$ where x is the SN of the first received PDCP Data PDU. For target SRB configured with state variables continuation, the initial value is the value stored in PDCP entity for the corresponding source SRB. For source SRB configured with state variables continuation, the initial value is the value stored in PDCP entity for the corresponding target SRB.

NOTE: It is up to UE implementation to select HFN for RX_NEXT as such that initial value of RX_DELIV should be a positive value.

b) RX_DELIV

This state variable indicates the COUNT value of the first PDCP SDU not delivered to the upper layers, but still waited for. The initial value is 0, except for sidelink broadcast and groupcast, and for SRBs configured with state variables continuation. For NR sidelink communication for broadcast and groupcast, the initial value of the SN part of RX_DELIV is $(x-0.5\times2^{[sl\text{-}PDCP\text{-}SN\text{-}Size-1]})$ modulo $(2^{[sl\text{-}PDCP\text{-}SN\text{-}Size]})$, where x is the SN of the first received PDCP Data PDU. For target SRB configured with state variables continuation, the initial value is the value stored in PDCP entity for the corresponding source SRB. For source SRB configured with state variables continuation, the initial value is the value stored in PDCP entity for the corresponding target SRB.

c) RX_REORD

This state variable indicates the COUNT value following the COUNT value associated with the PDCP Data PDU which triggered t-Reordering. For target SRB configured with state variables continuation, the initial value is the value stored in PDCP entity for the corresponding source SRB. For source SRB configured with state variables continuation, the initial value is the value stored in PDCP entity for the corresponding target SRB.

In the disclosure, the LTE PDCP layer device where the integrity protection or verification procedure has been set up may perform a header compression procedure if the header compression function or protocol (ROHC or EHC) has been set up when processing higher layer device data (PDCP SDU), perform a data compression procedure if the data compression function or protocol (UDC) has been set up, and apply an integrity protection procedure to the data or the header-compressed data, or the data-compressed data and, in the foregoing, perform an ciphering procedure on the integrity-protected data, add a PDCP header, and transfer the same to the lower layer device.

Figure 13:
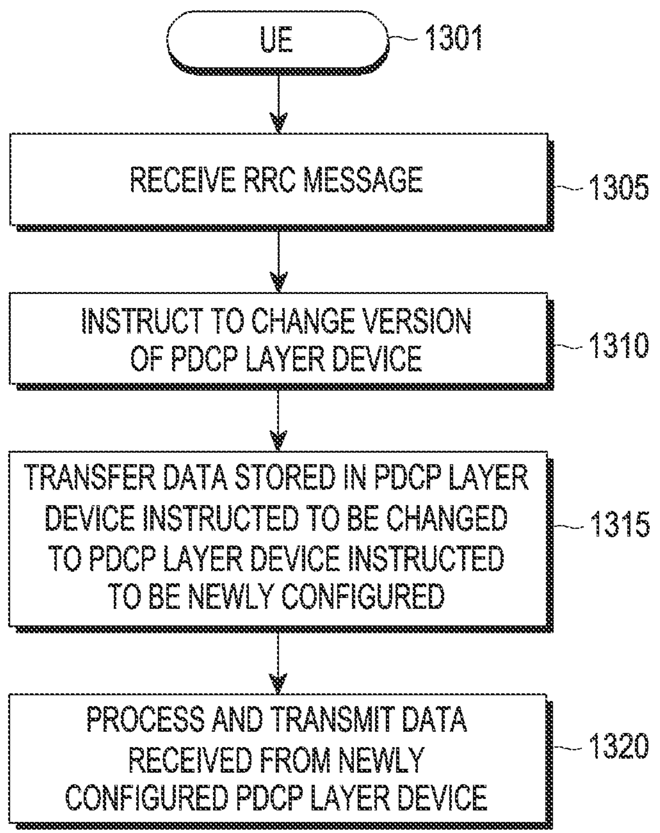
FIG. 13 is a view illustrating a UE operation for a procedure for changing the version of a PDCP layer device without loss proposed according to an embodiment of the disclosure.

FIG. 13 is a view illustrating a UE operation for a procedure for changing the version of a PDCP layer device without loss proposed according to an embodiment of the disclosure.

In FIG. 13, the UE 1301 receives the RRC message (1305) and, if a version change of the PDCP layer device is instructed, releases the current version of PDCP layer device corresponding to the first bearer to prevent data loss for uplink data of the first bearer and, before discarding the data, transfers the data (e.g., PDCP SDU) stored in the current version of PDCP layer device to the newly configured version of PDCP layer device so that the data is regarded as data received from the higher layer device by the new version of PDCP layer device, and data processing (e.g., newly configuring the PDCP header for the received PDCP SDUs to fit the configuration of the new PDCP layer device and performing integrity protection or ciphering with a new security key to configure the PDCP PDU) is performed again and transmitted (1320).

What data is to be transferred to the version-changed PDCP layer device among the data (e.g., PDCP SDU) stored in the PDCP layer device before the version is changed in the UE operations may be determined according to the first embodiment, second embodiment, or third embodiment proposed above in the disclosure.

Figure 14:
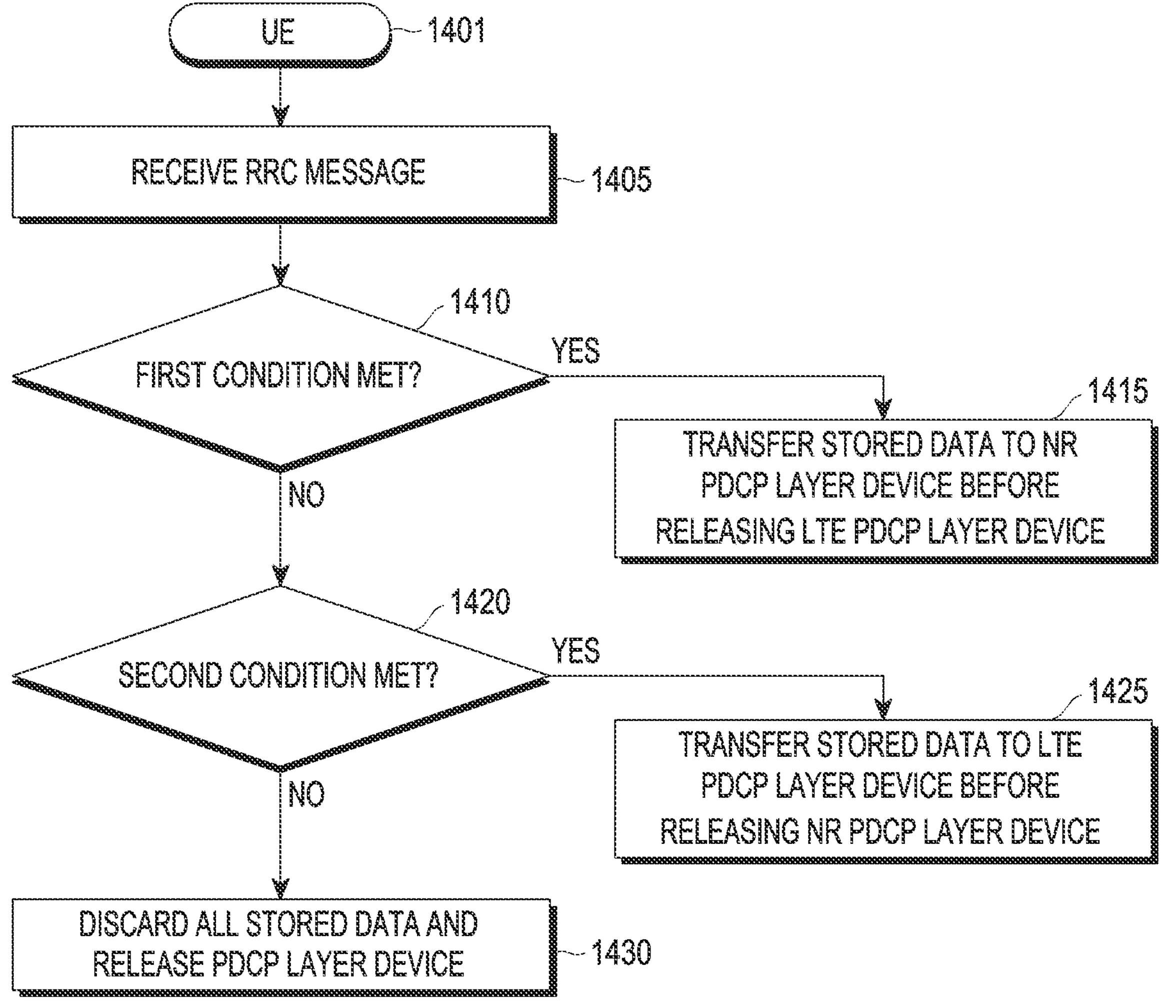
FIG. 14 is a view illustrating a specific UE operation for a procedure for changing the version of a PDCP layer device without loss proposed according to an embodiment of the disclosure.

FIG. 14 is a view illustrating a specific UE operation for a procedure for changing the version of a PDCP layer device without loss according to an embodiment of the disclosure.

In FIG. 14, the UE 1401 receives the RRC message (1405) and identifies whether it corresponds to the first condition (1410).

If the first condition is met, i.e., if the NR PDCP configuration information corresponding to the first bearer identifier is not included in the RRC message including the configuration for releasing the LTE PDCP device corresponding to the first bearer identifier, and the NR PDCP for the first bearer identifier is already configured (when the version change from the LTE PDCP layer device to the NR PDCP layer device is indicated), the next operation 1410 is performed (1415).

- The PDCP PDUs are discarded and the LTE PDCP layer device is released, and before the release, the PDCP SDUs are completely transferred to the NR PDCP layer device, then the PDCP SDUs are discarded and the LTE PDCP layer device is released.
- The PDCP SDUs received from the LTE PDCP layer device are regarded as data received from an higher layer by the NR PDCP layer device, and is subjected to data processing and transmitted.

If the first condition is not met but the second condition is met (1420), i.e., if the LTE PDCP layer device configuration information corresponding to the first bearer identifier is included in the RRC message including the configuration for releasing the NR PDCP device for the first bearer identifier where the NR PDCP device and the LTE RLC device are configured, the next operation is performed (1425).

- The PDCP PDUs are discarded and the LTE PDCP layer device is released, and before the release, the PDCP SDUs are completely transferred to the NR PDCP layer device, then the PDCP SDUs are discarded and the LTE PDCP layer device is released.
- The PDCP SDUs received from the LTE PDCP layer device are regarded as data received from an higher layer by the NR PDCP layer device, and is subjected to data processing and transmitted.

When the first condition or the second condition is not met and the release of the LTE PDCP layer device or the NR PDCP layer device is indicated (1420), the next operation is performed (1430).

- The PDCP SDUs and PDCP PDUs are discarded, and the LTE PDCP layer device or NR PDCP layer device is released.

What data is to be transferred to the version-changed PDCP layer device among the data (e.g., PDCP SDU) stored in the PDCP layer device before the version is changed in the UE operations may be determined according to the first embodiment, second embodiment, or third embodiment proposed above in the disclosure.

Hereinafter, an issue in which data loss may occur due to configuration of the PDCP reordering timer in the reception PDCP layer device is described, and a method for addressing the issue is proposed In the disclosure, the PDCP layer device may drive the PDCP reordering timer. The PDCP reordering timer may be driven or started when a PDCP serial number gap occurs based on the PDCP serial number in the reception PDCP layer device. If data corresponding to the PDCP serial number gap does not arrive until the PDCP reordering timer expires, data are transferred to the higher layer device in ascending order of the PDCP serial number or the COUNT value, and the reception window is moved after the transferred PDCP serial number. Therefore, if the data corresponding to the PDCP serial number gap arrives late after the PDCP reordering timer expires, because the data is not in the reception window, the data is discarded by the reception PDCP layer device, and data loss results.

Accordingly, in the disclosure, when the AM DRB is configured in the UE through the RRC message, it is proposed that the PDCP layer device of the AM DRB of the UE does not use the PDCP reordering timer to prevent data loss. Alternatively, when the AM DRB is configured, it is proposed that the PDCP layer device of the AM DRB of the UE sets the PDCP reordering timer value to infinity to prevent data loss. Alternatively, it is proposed that when the base station configures the AM DRB to the UE, the PDCP reordering timer of the PDCP layer device corresponding to the AM DRB is not configured or the PDCP reordering timer value is set to infinity to prevent data loss.

Figure 15:
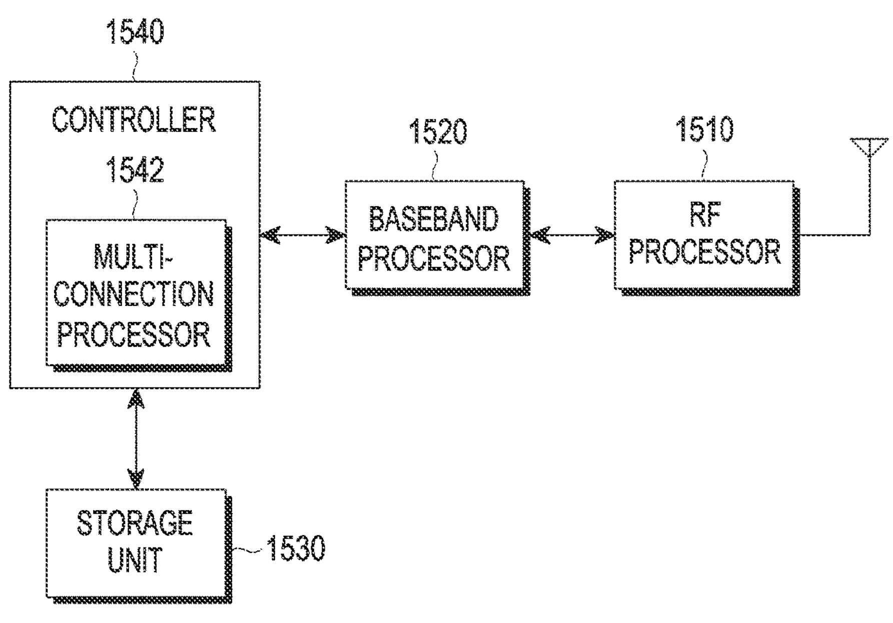
FIG. 15 illustrates a structure of a UE according to an embodiment of the disclosure.

FIG. 15 illustrates a structure of a UE according to an embodiment of the disclosure.

Referring to the figure, the UE includes a radio frequency (RF) processor 1510, a baseband processor 1520, a storage unit 1530, and a controller 1540.

The RF processor 1510 performs a function for transmitting and receiving a signal through a radio channel such as band conversion and amplification of a signal. In other words, the RF processor 1510 up-converts the baseband signal provided from the baseband processor 1520 into an RF band signal, transmits it through the antenna, and down-converts the RF band signal received through the antenna into a baseband signal. For example, the RF processor 1510 may include, e.g., a transmission filter, a reception filter, an amplifier, a mixer, an oscillator, a digital-to-analog converter (DAC), and an analog-to-digital converter (ADC). In the figure, only one antenna is shown, but the UE may include a plurality of antennas. The RF processor 1510 may include multiple RF chains. Further, the RF processor 1510 may perform beamforming. For beamforming, the RF processor 1510 may adjust the phase and magnitude of each of the signals transmitted/received through the plurality of antennas or antenna elements. Further, the RF processing unit may perform MIMO and receive several layers upon performing the MIMO operation. The RF processor 1510 may properly set up a plurality of antennas or antenna elements under the control of the controller to perform reception beam sweeping or may adjust the beam width and direction of the reception beam to allow the reception beam to synchronize with the transmission beam.

The baseband processor 1520 performs the function of conversion between a baseband signal and bit stream according to the system physical layer specifications. For example, upon data transmission, the baseband processor 1520 encodes and modulates a transmission bit stream, thereby generating complex symbols. Further, upon data reception, the baseband processor 1520 restores the reception bit stream by demodulating and decoding the baseband signal provided from the RF processor 1510. For example, in the case of following the orthogonal frequency division multiplexing (OFDM) scheme, upon data transmission, the baseband processor 1520 may generate complex symbols by encoding and modulating the transmission bit stream, map the complex symbols to a subcarrier, and then configures OFDM symbols through inverse fast Fourier transform (IFFT) operation and cyclic prefix (CP) insertion. Further, upon data reception, the baseband processor 1520 divides the baseband signal provided from the RF processor 1510 into OFDM symbol units, restores the signals mapped to the subcarriers through fast Fourier transform (FFT) operation, and then restores the reception bit stream through demodulation and decoding.

The baseband processor 1520 and the RF processor 1510 may transmit and receive signals as described above. Accordingly, the baseband processor 1520 and the RF processor 1510 may be referred to as a transmitter, a receiver, a transceiver, or a communication unit. Further, at least one of the baseband processor 1520 and the RF processor 1510 may include a plurality of communication modules for supporting a plurality of different radio access technologies. Further, at least one of the baseband processor 1520 and the RF processor 1510 may include different communication modules for processing signals in different frequency bands. For example, the different radio access technologies may include an LTE network, a NR network, and the like. Further, the different frequency bands may include a super-high frequency (SHF) (e.g., 2.2 GHz or 2 GHz) band or millimeter wave (mmWave) (e.g., 60 GHz) band.

The storage unit 1530 stores a basic program for operating the UE, application programs, configuration information, or other data. The storage unit 1530 provides the stored data at the request of the controller 1540.

The controller 1540 controls the overall operation of the UE. For example, the controller 1540 transmits/receives signals through the baseband processor 1520 and the RF processor 1510. Further, the controller 1540 records and reads data in/from the storage unit 1540. To that end, the controller 1540 may include at least one processor. For example, the controller 1540 may include a communication processor (CP) that performs control for communication and an application processor (AP) that controls an upper layer, such as an application program.

As an embodiment, the controller 1540 may receive an RRC message including bearer configuration information. As an embodiment, the bearer configuration information may include new radio (NR) packet data convergence protocol (PDCP) configuration information for a data radio bearer (DRB), and the NR PDCP configuration information may include information related to the integrity protection function for the DRB.

As an embodiment, based on the NR PDCP configuration information, an NR PDCP entity may be established.

As an embodiment, the controller 1540 may include the step of configuring the integrity protection function in the NR PDCP entity.

As an embodiment, in the bearer configuration information, LTE PDCP configuration information for the DRB may not be configured.

As an embodiment, the information related to the integrity protection function may indicate that the integrity protection function is configured for the DRB.

As an embodiment, the information related to the integrity protection function may be set to the same value for all DRBs having the same protocol data unit (PDU) session ID.

As an embodiment, the UE may support the user plane integrity protection (UPIP) function.

As an embodiment, the bearer configuration information may further include information indicating a security algorithm to be used for the integrity protection function.

As an embodiment, the controller 1540 may transfer data stored in the LTE PDCP entity to the NR PDCP entity before releasing the LTE PDCP entity.

Figure 16:
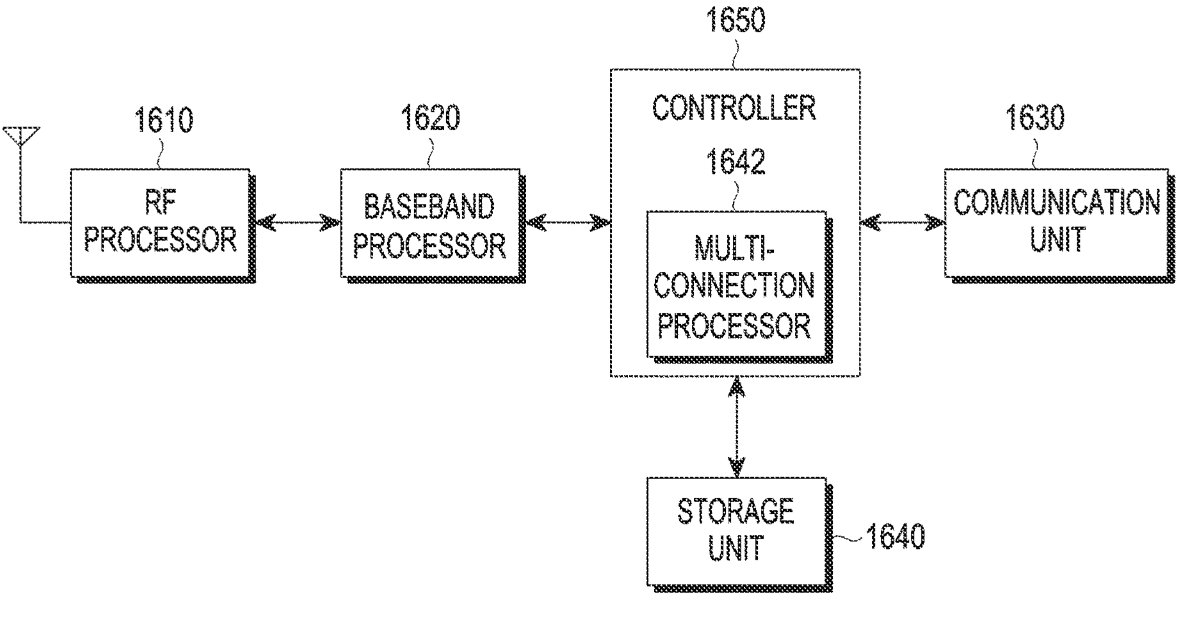
FIG. 16 is a block diagram illustrating a configuration of a base station in a wireless communication system according to an embodiment of the disclosure.

FIG. 16 is a block diagram illustrating a configuration of a base station in a wireless communication system according to an embodiment of the disclosure.

As shown in the figure, the base station may include an RF processor 1610, a baseband processor 1620, a backhaul communication unit 1630, a storage unit 1640, and a controller 1650.

The RF processor 1610 performs a function for transmitting and receiving a signal through a radio channel such as band conversion and amplification of a signal. In other words, the RF processor 1610 up-converts the baseband signal provided from the baseband processor 1620 into an RF band signal, transmits it through the antenna, and down-converts the RF band signal received through the antenna into a baseband signal. For example, the RF processor 1610 may include a transmission filter, a reception filter, an amplifier, a mixer, an oscillator, a DAC, and an ADC. In the figure, only one antenna is shown, but the first access node may include a plurality of antennas. The RF processor 1610 may include multiple RF chains. Further, the RF processor 1610 may perform beamforming. For beamforming, the RF processor 1610 may adjust the phase and magnitude of each of the signals transmitted/received through the plurality of antennas or antenna elements. The RF processing unit may perform downlink MIMO operation by transmitting one or more layers.

The baseband processor 1620 performs the function of conversion between a baseband signal and bit stream according to the physical layer specifications of the first radio access technology. For example, upon data transmission, the baseband processor 1620 encodes and modulates a transmission bit stream, thereby generating complex symbols. Further, upon data reception, the baseband processor 1620 restores the reception bit stream by demodulating and decoding the baseband signal provided from the RF processor 1610. For example, in the case of following the OFDM scheme, upon data transmission, the baseband processor 1620 may generate complex symbols by encoding and modulating the transmission bit stream, map the complex symbols to a subcarrier, and then configures OFDM symbols through IFFT operation and CP insertion. Further, upon data reception, the baseband processor 1620 divides the baseband signal provided from the RF processor 1610 into OFDM symbol units, restores the signals mapped to the subcarriers through the FFT, and then restores the reception bit stream through demodulation and decoding. The baseband processor 1620 and the RF processor 1610 may transmit and receive signals as described above. Accordingly, the baseband processor 1620 and the RF processor 1610 may be referred to as a transmitter, a receiver, a transceiver, a communication unit, or a wireless communication unit.

The communication unit 1630 provides an interface for communicating with other nodes in the network.

The storage unit 1640 stores a basic program for operating the primary base station, application programs, configuration information, or other data. In particular, the storage unit 1640 may store, e.g., information about the bearer allocated to the connected UE and the result of measurement reported from the connected UE. Further, the storage unit 1640 may store information that serves as a reference for determining whether to provide multiple connections to the UE or stop. Further, the storage unit 1640 provides the stored data at the request of the controller 1650.

The controller 1650 controls the overall operation of the primary base station. For example, the controller 1650 transmits and receives signals through the baseband processor 1620 and the RF processor 1610 or through the backhaul communication unit 1630. Further, the controller 1650 records and reads data in/from the storage unit 1640. To that end, the controller 1650 may include at least one processor.

As an embodiment, the controller 1650 may generate an RRC message including bearer configuration information.

As an embodiment, the controller 1650 may transmit the RRC message to a UE connected to an evolved packet core (EPC) system. As an embodiment, the bearer configuration information may include new radio (NR) packet data convergence protocol (PDCP) configuration information for a data radio bearer (DRB), and the NR PDCP configuration information may include information related to the integrity protection function for the DRB.

As an embodiment, based on the NR PDCP configuration information, an NR PDCP entity may be established.

As an embodiment, the controller 1540 may include the step of configuring the integrity protection function in the NR PDCP entity.

As an embodiment, in the bearer configuration information, LTE PDCP configuration information for the DRB may not be configured.

As an embodiment, the information related to the integrity protection function may indicate that the integrity protection function is configured for the DRB.

As an embodiment, the information related to the integrity protection function may be set to the same value for all DRBs having the same protocol data unit (PDU) session ID.

As an embodiment, the UE may support the user plane integrity protection (UPIP) function.

As an embodiment, the bearer configuration information may further include information indicating a security algorithm to be used for the integrity protection function.

The embodiments herein are provided merely for better understanding of the present invention, and the present invention should not be limited thereto or thereby. In other words, it is apparent to one of ordinary skill in the art that various changes may be made thereto without departing from the scope of the disclosure. Further, the embodiments may be practiced in combination.

The invention claimed is:

1. A method performed by a user equipment (UE) in a wireless communication system, the method comprising:

receiving, from a base station, a radio resource control (RRC) connection reconfiguration message including bearer configuration information, wherein the bearer configuration information includes packet data convergence protocol (PDCP) configuration information on at least one data radio bearer (DRB) and security algorithm information to be used for the at least one DRB;

adding the at least one DRB based on the bearer configuration information and configuring a new radio (NR) PDCP entity of the at least one DRB based on the PDCP configuration information; and activating an integrity protection function associated with the NR PDCP entity of the at least one DRB based on the security algorithm information upon the addition of the at least one DRB, wherein the base station is a long-term evolution (LTE) base station different from an NR base station, and wherein the security algorithm information for all signaling radio bearers (SRBs) and all DRBs is signaled identically by the bearer configuration information.

2. The method of claim 1, wherein a protocol data unit (PDU) session identifier (ID) for all of the SRBs and all of the DRBs is identical.

3. The method of claim 1, wherein the UE supports a user plane integrity protection (UPIP) function.

4. The method of claim 1, wherein activating the integrity protection function comprises determining a security key based on the security algorithm information.

5. A method performed by a base station in a wireless communication system, the method comprising:

generating a radio resource control (RRC) connection reconfiguration message including bearer configuration information; and transmitting, to a user equipment (UE), the RRC connection reconfiguration message, wherein the bearer configuration information includes packet data convergence protocol (PDCP) configuration information on at least one data radio bearer (DRB) and security algorithm information to be used for the at least one DRB, wherein the bearer configuration information is configured for adding the at least one DRB and the PDCP configuration information is configured to configure a new radio (NR) PDCP entity of the at least one DRB, wherein the security algorithm information is configured to activate an integrity protection function associated with the NR PDCP entity of the at least one DRB upon the addition of the at least one DRB, and wherein the base station is a long-term evolution (LTE) base station different from an NR base station, and wherein the security algorithm information for all signaling radio bearers (SRBs) and all DRBs is signaled identically by the bearer configuration information.

6. The method of claim 5, wherein a protocol data unit (PDU) session ID for all of the SRBs and all of the DRBs is identical.

7. The method of claim 5, wherein the security algorithm information is used to determine a security key for the integrity protection function.

8. A user equipment (UE) in a wireless system, comprising:

a transceiver; and at least one processor coupled with the transceiver, wherein the at least one processor is configured to:

receive, from a base station, a radio resource control (RRC) connection reconfiguration message including bearer configuration information, wherein the bearer configuration information includes packet data convergence protocol (PDCP) configuration information on at least one data radio bearer (DRB) and security algorithm information to be used for the at least one DRB, add the at least one DRB based on the bearer configuration information and configure a new radio (NR) PDCP entity of the at least one DRB based on the PDCP configuration information, and activate an integrity protection function associated with the NR PDCP entity of the at least one DRB based on the security algorithm information upon the addition of the at least one DRB, wherein the base station is a long-term evolution (LTE) base station different from an NR base station, and wherein the security algorithm information for all signaling radio bearers (SRBs) and all DRBs is signaled identically by the bearer configuration information.

9. A base station in a wireless communication system, the base station comprising:

a transceiver; and at least one processor coupled with the transceiver, wherein the at least one processor is configured to:

generate a radio resource control (RRC) connection reconfiguration message including bearer configuration information, and transmit, to a user equipment (UE), the RRC connection reconfiguration message, wherein the bearer configuration information includes packet data convergence protocol (PDCP) configuration information on at least one data radio bearer (DRB) and security algorithm information to be used for the at least one DRB, and wherein the bearer configuration information is used to add the at least one DRB and the PDCP configuration information is used to configure a new radio (NR) PDCP entity of the at least one DRB, wherein the security algorithm information is used to activate an integrity protection function associated with the NR PDCP entity of the at least one DRB upon the addition of the at least one DRB, wherein the base station is a long-term evolution (LTE) base station different from an NR base station, and wherein the security algorithm information for all signaling radio bearers (SRBs) and all DRBs is signaled identically by the bearer configuration information.

10. The UE of claim 8, wherein a protocol data unit (PDU) session identifier (ID) for all of the SRBs and all of the DRBs is identical.

11. The UE of claim 8, wherein the UE supports a user plane integrity protection (UPIP) function.

12. The UE of claim 8, wherein at least one processor is further configured to determine a security key based on the security algorithm information.

13. The base station of claim 9, wherein a protocol data unit (PDU) session identifier (ID) for all of the SRBs and all of the DRBs is identical.

14. The base station of claim 9, wherein the security algorithm information is used to determine a security key for the integrity protection function.

* * * * *